US00RE49901E

(19) United States
(12) Reissued Patent
Little et al.

(10) Patent Number: US RE49,901 E
(45) Date of Reissued Patent: Apr. 2, 2024

(54) ELECTRICAL RECEPTACLE FOR TRANSMITTING HIGH SPEED SIGNAL

(71) Applicant: FOXCONN INTERCONNECT TECHNOLOGY LIMITED, Grand Cayman (KY)

(72) Inventors: Terrance F. Little, Fullerton, CA (US); Chih-Hsien Chou, San Jose, CA (US); Chun-Hsiung Hsu, New Taipei (TW); Kuei-Chung Tsai, New Taipei (TW)

(73) Assignee: FOXCONN INTERCONNECT TECHNOLOGY LIMITED, Grand Cayman (KY)

(21) Appl. No.: 17/389,033

(22) Filed: Jul. 29, 2021

Related U.S. Patent Documents

Reissue of:
(64) Patent No.: 10,367,308
Issued: Jul. 30, 2019
Appl. No.: 15/795,234
Filed: Oct. 26, 2017

U.S. Applications:
(60) Provisional application No. 62/412,841, filed on Oct. 26, 2016.

(51) Int. Cl.
*H01R 13/6585* (2011.01)
*H01R 4/2404* (2018.01)
(Continued)

(52) U.S. Cl.
CPC ..... *H01R 13/6585* (2013.01); *H01R 4/2404* (2013.01); *H01R 9/2408* (2013.01);
(Continued)

(58) Field of Classification Search
None
See application file for complete search history.

(56) References Cited

U.S. PATENT DOCUMENTS 4,298,237 A 11/1981 Griffith et al.
4,806,103 A 2/1989 Kniese et al.
(Continued)

FOREIGN PATENT DOCUMENTS

CN 2355446 Y 12/1999
CN 2770156 Y 4/2006
(Continued)

OTHER PUBLICATIONS

The first Office Action of CN application No. 201711019769.8 dated Jul. 1, 2020, 07 Pages (04 Pages of English Translation and 03 Pages of Official notification).
(Continued)

*Primary Examiner* — Karin Reichle

(57) ABSTRACT

An electrical connector includes an insulative housing defining a front cavity for receiving and *a* rear cavity, a terminal assembly assembled in the rear cavity, and a ground member. The terminal assembly includes an upper terminal module, a lower terminal module sandwiching a shielding module therebetween. [Said] *The* upper terminal module includes a pair of upper ground terminals. [Said] *The* lower terminal module includes a plurality of lower ground terminals. [Said] *The* shielding module includes *a* metallic shielding plate. The ground member is associated with the shielding module to mechanically and electrically connect at least one of the upper ground terminals and the lower ground terminals with the shielding plate.

20 Claims, 41 Drawing Sheets

Amended

(51) Int. Cl.

| | |
|---|---|
| ***H01R 9/24*** | (2006.01) |
| ***H01R 12/00*** | (2006.01) |
| ***H01R 12/71*** | (2011.01) |
| ***H01R 12/72*** | (2011.01) |
| ***H01R 13/506*** | (2006.01) |
| ***H01R 13/6471*** | (2011.01) |
| ***H01R 13/66*** | (2006.01) |
| *H01R 107/00* | (2006.01) |

(52) U.S. Cl.
CPC ..... *H01R 12/00* (2013.01); *H01R 12/712* (2013.01); *H01R 12/724* (2013.01); *H01R 13/506* (2013.01); *H01R 13/6471* (2013.01); *H01R 13/6658* (2013.01); *H01R 2107/00* (2013.01)

(56) References Cited

U.S. PATENT DOCUMENTS

| | | | | |
|---|---|---|---|---|
| 5,051,099 | A | 9/1991 | Pickles et al. | |
| 5,110,309 | A | 5/1992 | Ichitsubo | |
| 5,239,748 | A | 8/1993 | Hamilton | |
| 5,986,880 | A | 11/1999 | Santeler et al. | |
| 6,361,373 | B1 | 3/2002 | Horchler | |
| 6,368,129 | B1 | 4/2002 | Wang et al. | |
| 7,402,077 | B2 | 7/2008 | Shindo | |
| 7,604,490 | B2 * | 10/2009 | Chen | H01R 13/6471 439/541.5 |
| 7,682,163 | B2 * | 3/2010 | Hou | H01R 23/6873 439/79 |
| 7,798,820 | B2 * | 9/2010 | Hong | H05K 1/117 385/92 |
| 7,837,499 | B1 * | 11/2010 | Chen | H01R 12/712 439/541.5 |
| 8,142,207 | B1 | 3/2012 | Ljubijankic et al. | |
| 8,353,707 | B2 * | 1/2013 | Wang | H01R 13/6658 439/60 |
| 8,500,488 | B2 | 8/2013 | Hsu et al. | |
| 8,540,525 | B2 | 9/2013 | Regnier et al. | |
| 8,727,793 | B2 | 5/2014 | Cafiero et al. | |
| 8,764,460 | B2 | 7/2014 | Smink et al. | |
| 8,764,464 | B2 | 7/2014 | Buck et al. | |
| 8,764,488 | B2 * | 7/2014 | Zeng | H01R 13/6585 439/108 |
| 8,808,029 | B2 | 8/2014 | Castillo et al. | |
| 8,858,243 | B2 * | 10/2014 | Luo | H01R 13/652 439/108 |
| 8,944,830 | B2 | 2/2015 | Little et al. | |
| 9,337,585 | B1 * | 5/2016 | Yang | H01R 13/6583 |
| 9,401,570 | B2 | 7/2016 | Phillips et al. | |
| 9,431,768 | B1 | 8/2016 | Champion et al. | |
| 9,496,657 | B1 * | 11/2016 | Chang | H01R 13/6471 |
| 9,531,129 | B2 | 12/2016 | de Boer | |
| 9,640,915 | B2 | 5/2017 | Phillips et al. | |
| 9,759,879 | B1 * | 9/2017 | Takai | G02B 6/428 |
| 9,793,633 | B2 * | 10/2017 | Liao | H01R 12/721 |
| 9,800,350 | B2 * | 10/2017 | Ko | H04B 10/60 |
| 10,396,513 | B2 | 8/2019 | Regnier | |
| 2001/0044235 | A1 * | 11/2001 | Cohen | H01R 13/6587 439/625 |
| 2011/0151716 | A1 * | 6/2011 | Kondo | H01R 13/6658 439/607.01 |
| 2011/0159747 | A1 * | 6/2011 | Tung | H01R 13/506 439/660 |
| 2012/0208405 | A1 * | 8/2012 | Wang | H01R 12/716 439/676 |
| 2013/0189856 | A1 | 7/2013 | Ko | |
| 2013/0196550 | A1 * | 8/2013 | Casher | H01R 12/724 439/660 |
| 2014/0348468 | A1 | 11/2014 | Lagziel et al. | |
| 2015/0093936 | A1 | 4/2015 | Little et al. | |
| 2015/0140866 | A1 * | 5/2015 | Tsai | H01R 12/724 439/637 |
| 2016/0006182 | A1 * | 1/2016 | Patel | H01R 13/652 439/108 |
| 2016/0204540 | A1 | 7/2016 | Chen | |
| 2017/0077632 | A1 * | 3/2017 | Liao | H01R 12/775 |
| 2017/0324202 | A1 * | 11/2017 | Little | H01R 12/721 |
| 2018/0034216 | A1 * | 2/2018 | Zhong | H01R 13/6597 |
| 2019/0089106 | A1 | 3/2019 | Regnier | |

FOREIGN PATENT DOCUMENTS

| | | | |
|---|---|---|---|
| CN | 101164204 | A | 4/2008 |
| CN | 100413153 | C | 8/2008 |
| CN | 102646878 | A | 8/2012 |
| CN | 203192990 | U | 9/2013 |
| CN | 203277695 | U | 11/2013 |
| CN | 103682777 | A | 3/2014 |
| CN | 203631875 | U | 6/2014 |
| CN | 203690612 | U | 7/2014 |
| CN | 104716486 | A | 6/2015 |
| CN | 104868321 | A | 8/2015 |
| CN | 205069933 | U | 3/2016 |
| CN | 105977666 | A | 9/2016 |
| TW | M370857 | U | 12/2009 |
| WO | 2012/027679 | A2 | 3/2012 |

OTHER PUBLICATIONS

The second Office Action of CN application No. 201711019769.8 dated Jan. 26, 2021, 15 Pages (08 Pages of English Translation and 07 Pages of Official notification).
The third Office Action of CN application No. 201711019769.8 dated Mar. 26, 2021, 12 Pages (07 Pages of English Translation and 05 Pages of Official notification).
Office Action received for CN application No. 201711013519.3, the first Office Action dated Apr. 30, 2020, 15 Pages (07 Pages of English Translation and 08 Pages of Official notification).
QDFP-DD Specification for QSFP Double Density 8X Pluggable Transceiver Rev 1.0 Sep. 15, 2016.
QDFP-DD Specification for QSFP Double Density 8X Pluggable Transceiver Rev 0.1 Mar. 8, 2016.

* cited by examiner

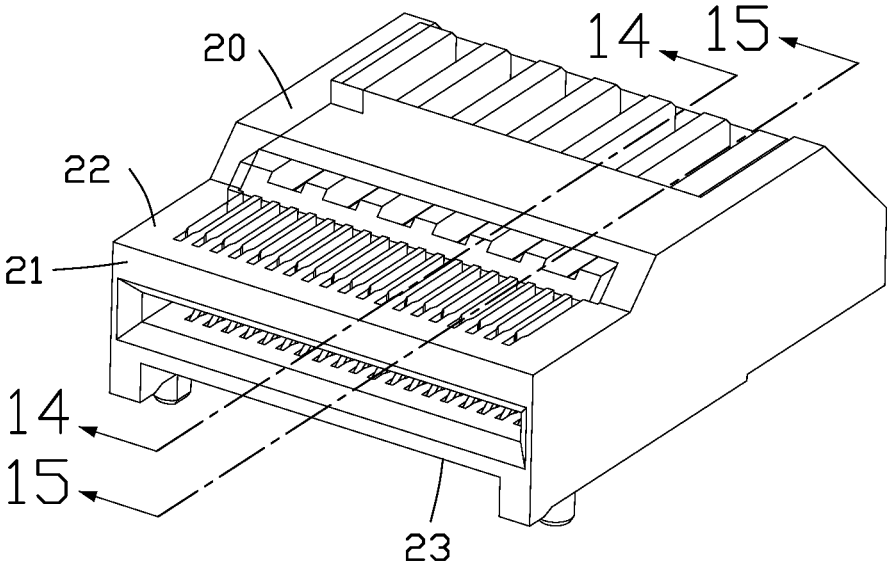
FIG. 5
Amended

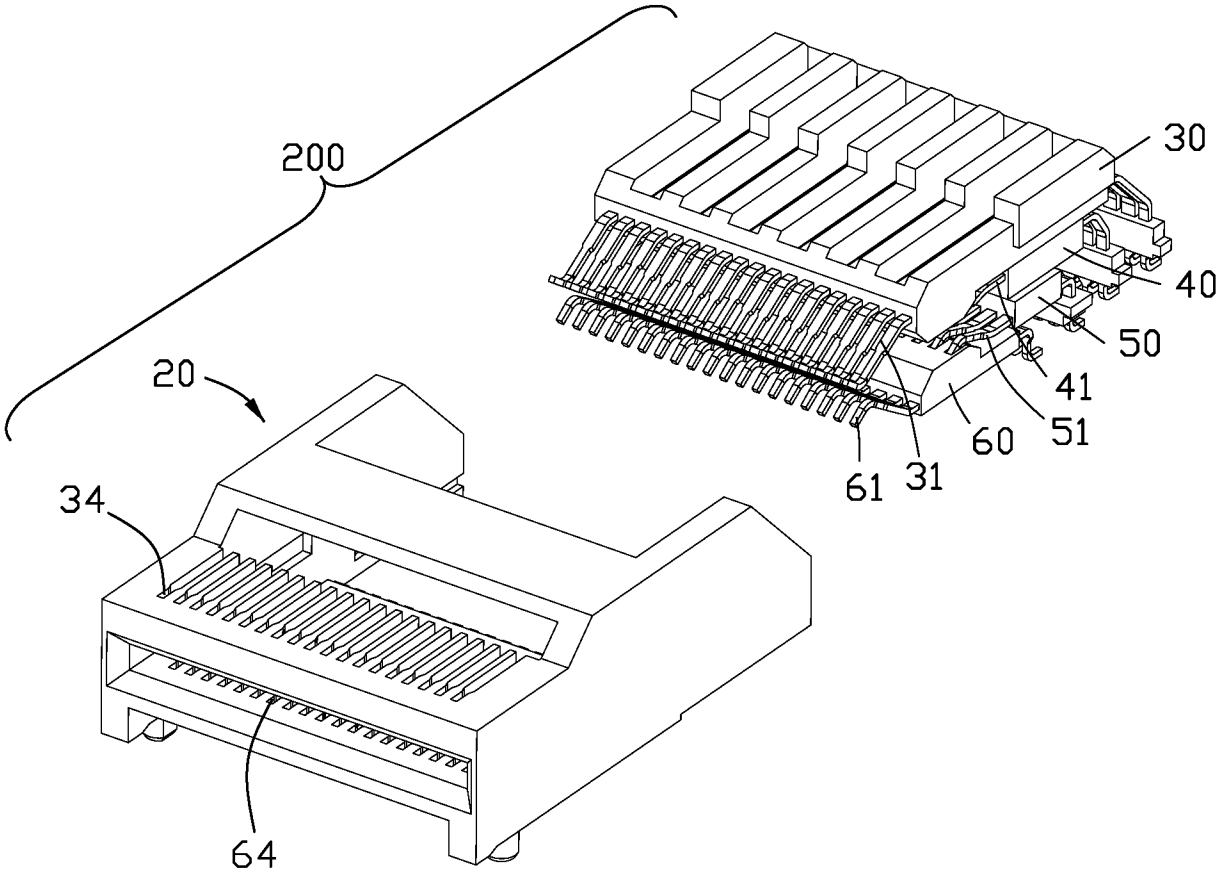
FIG. 6
Amended

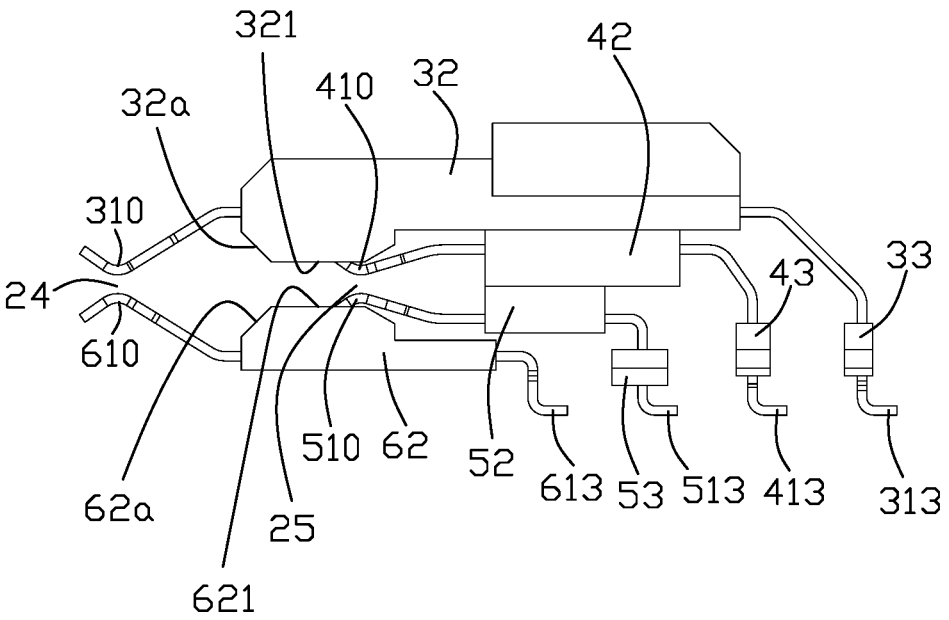
FIG. 8
Amended

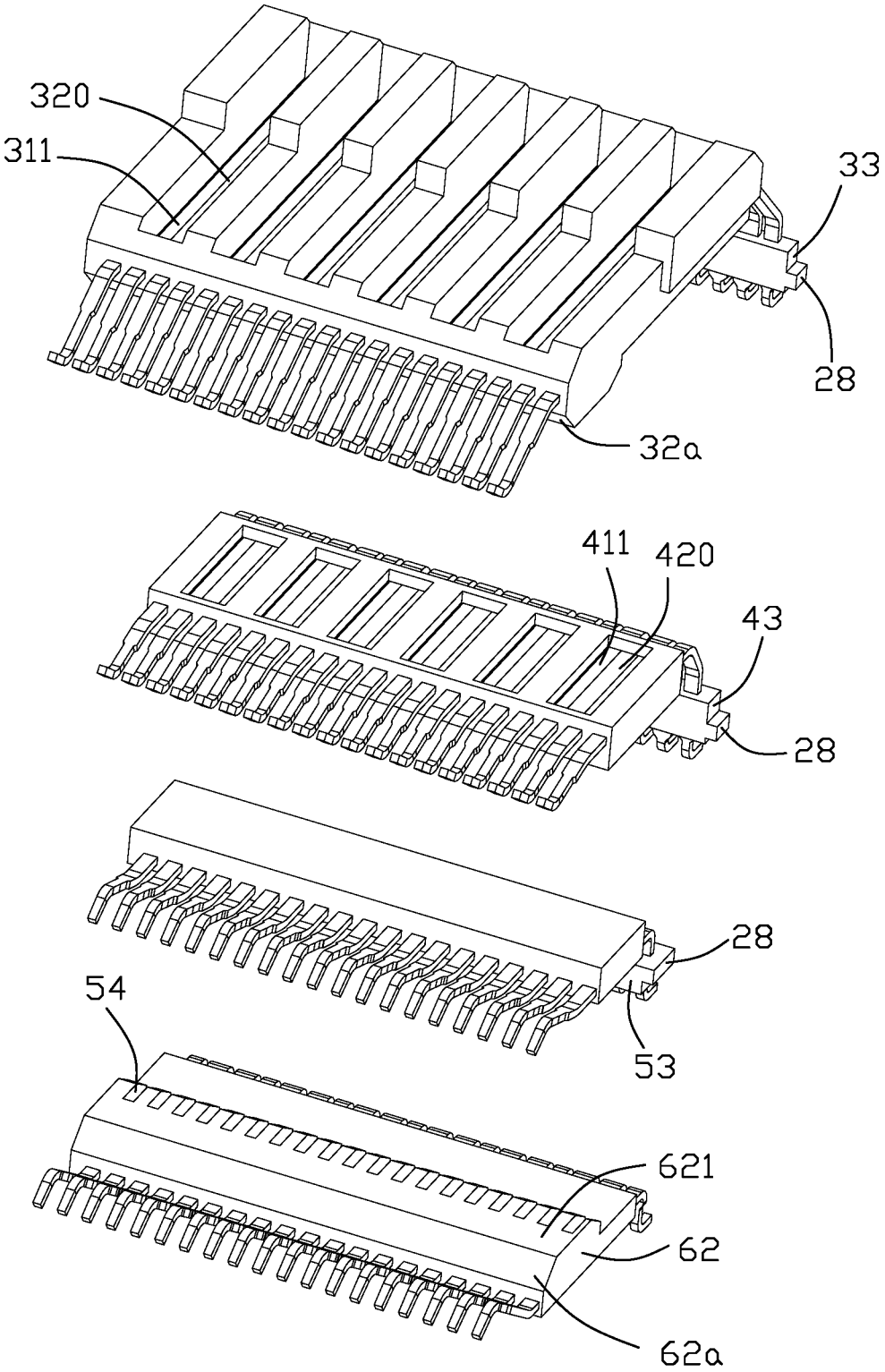
FIG. 11
Amended

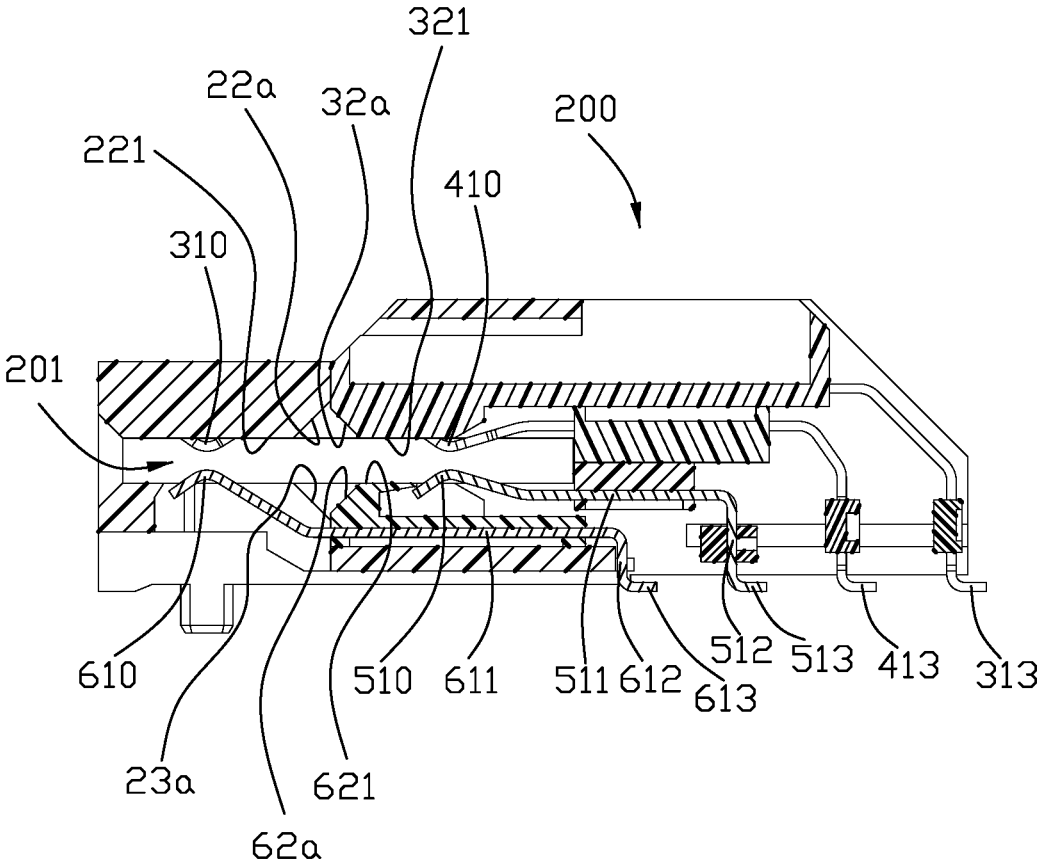
FIG. 14
Amended

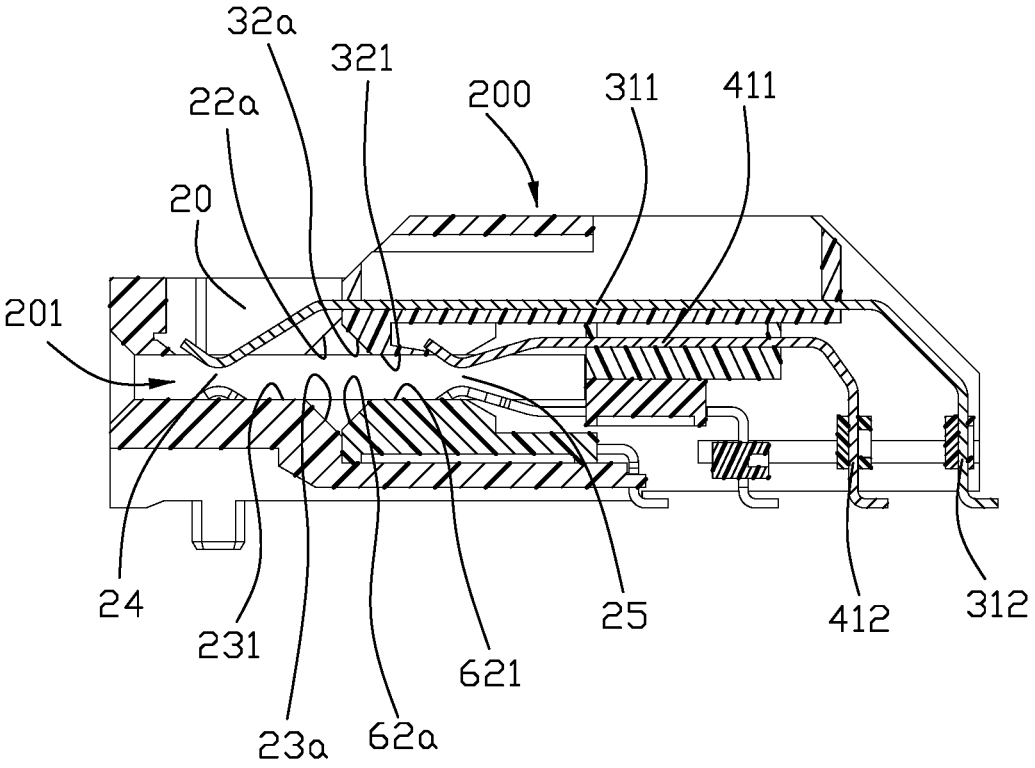
FIG. 15
Amended

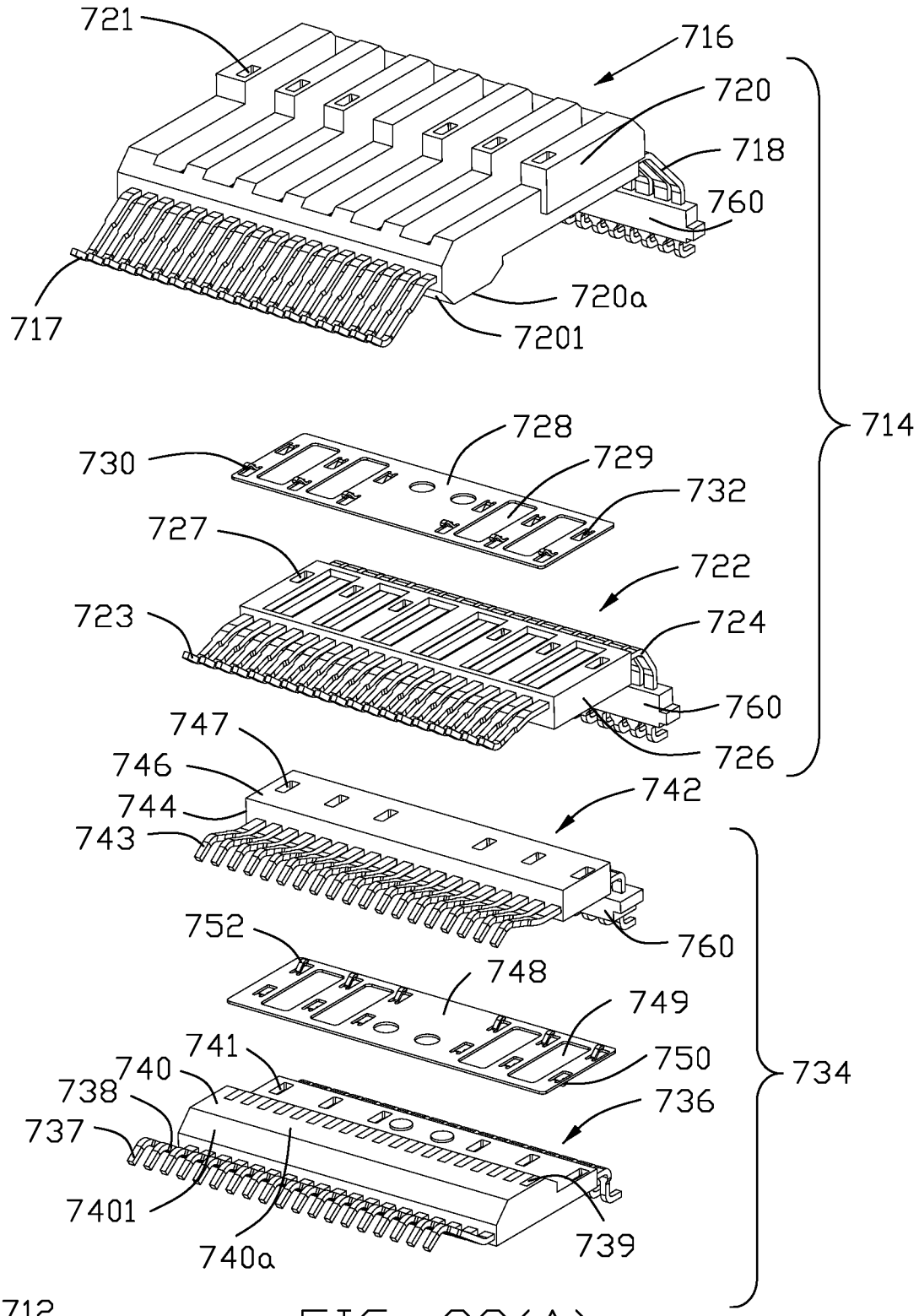
FIG. 22(A)
Amended

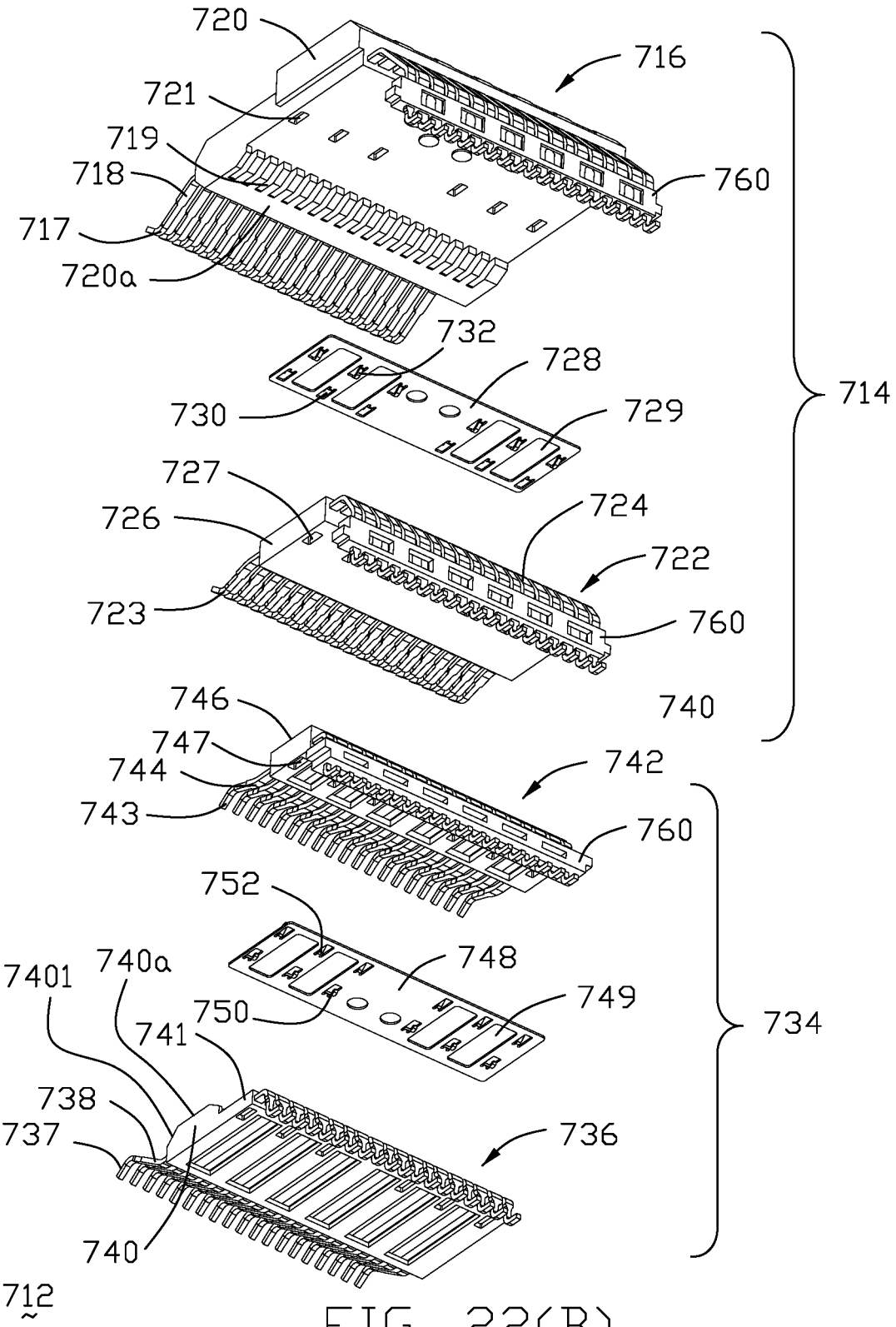
FIG. 22(B)
Amended

700

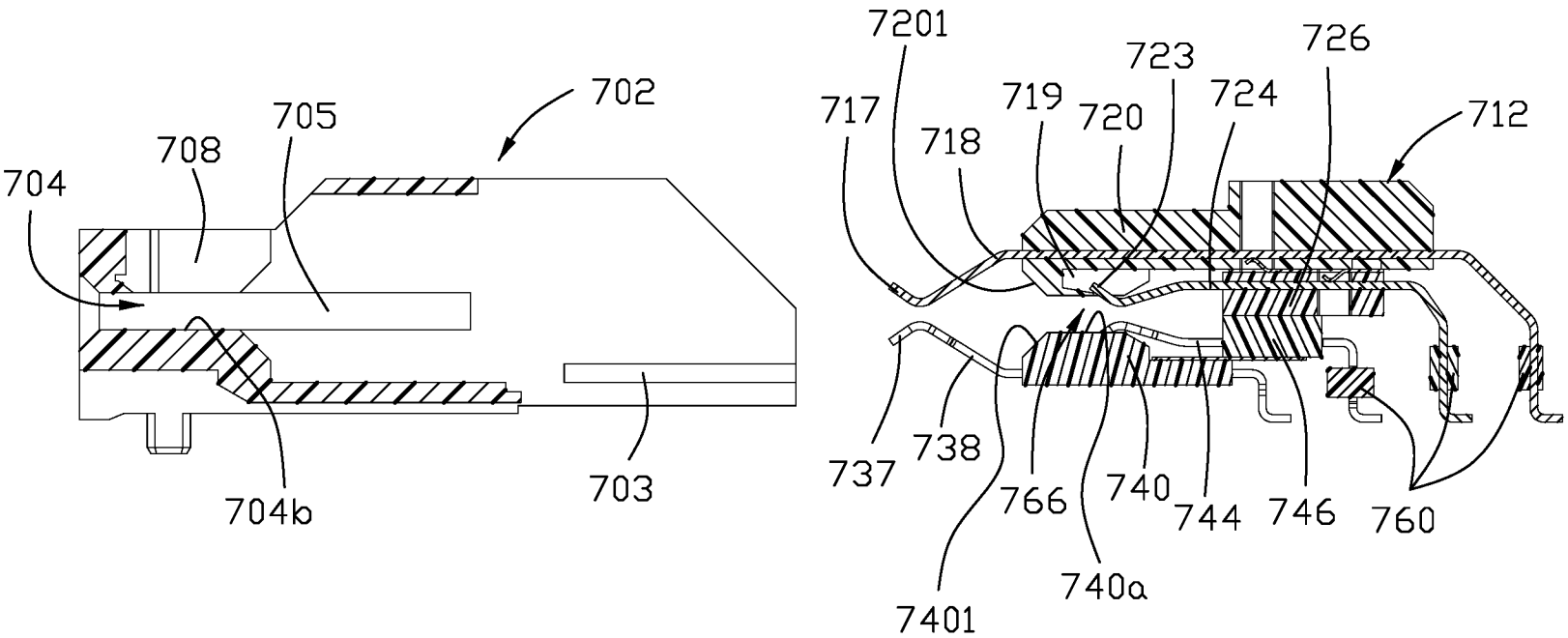
FIG. 24(A)
Amended

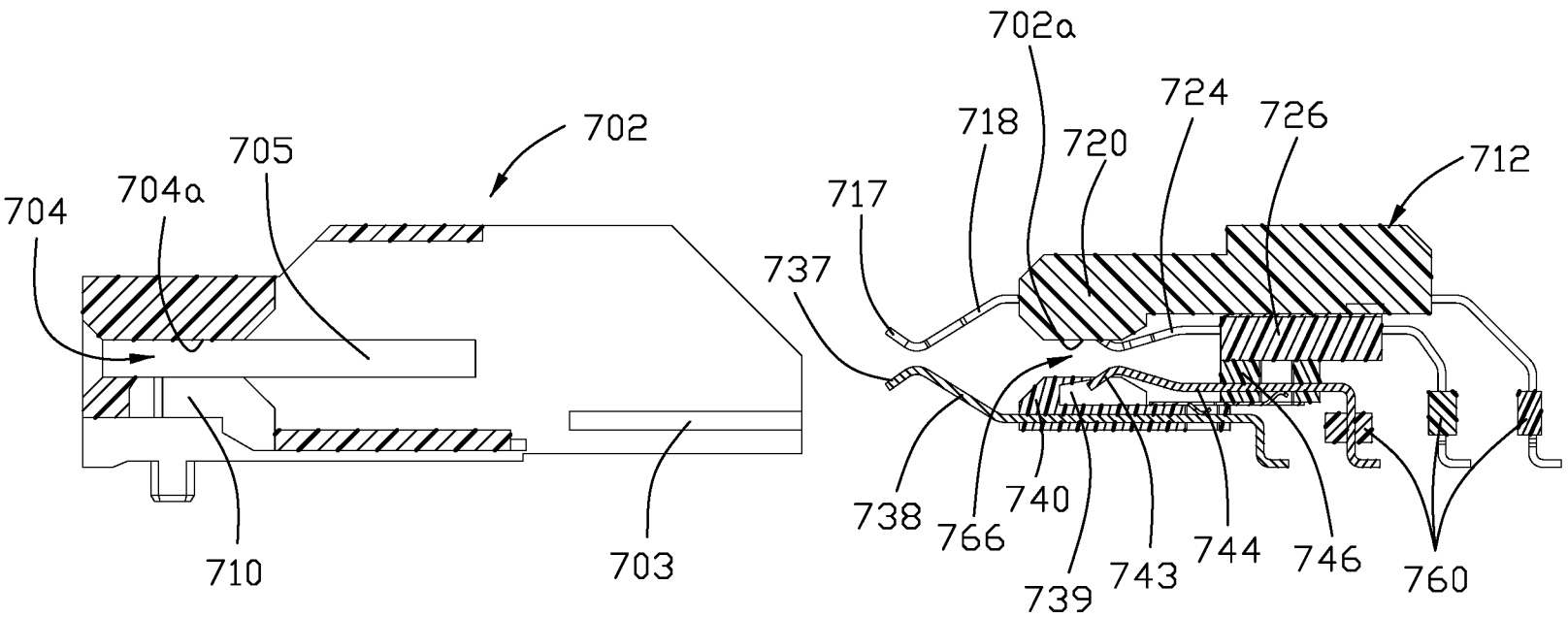
FIG. 24(B)
Amended

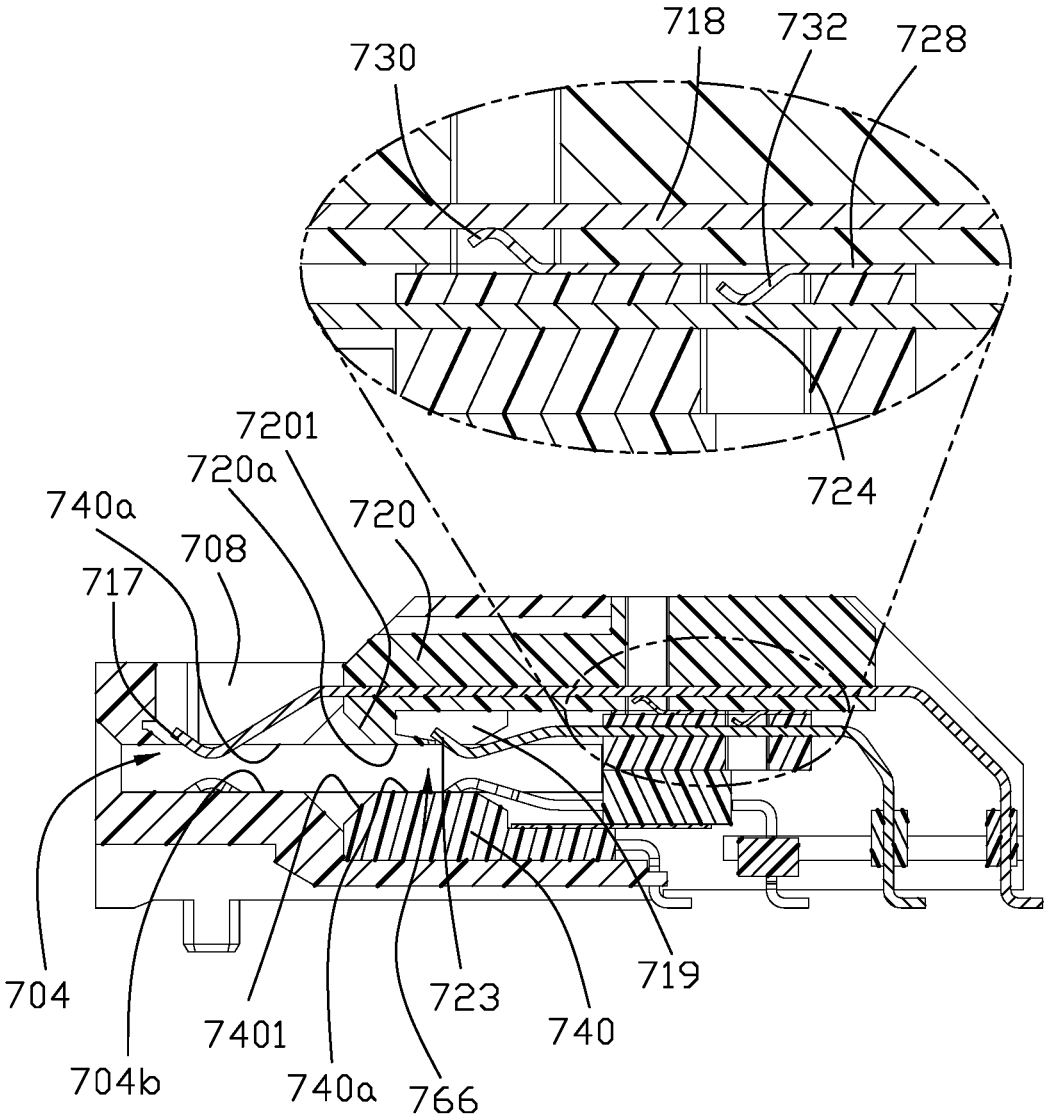
FIG. 25(A)
Amended

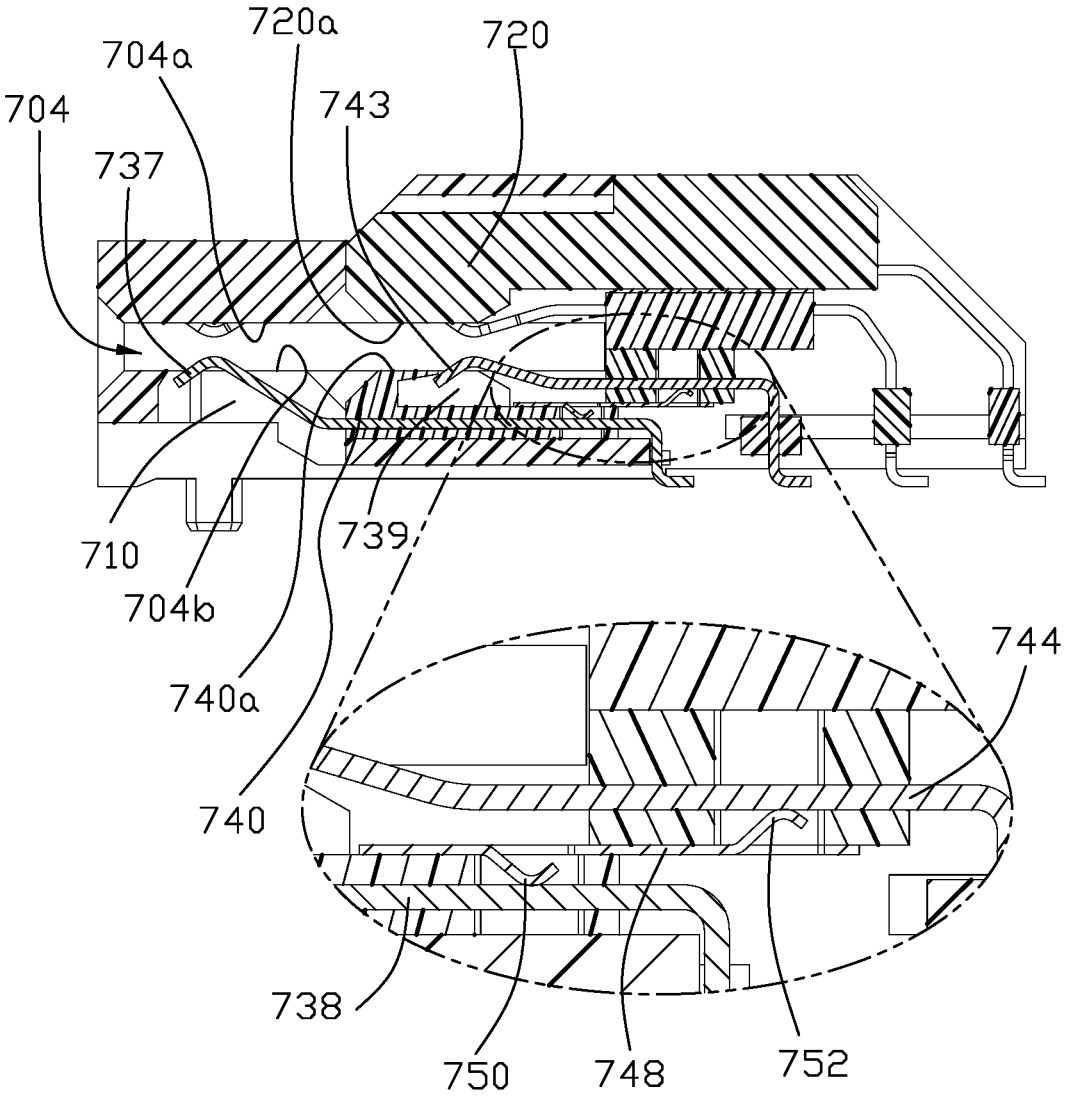
FIG. 25(B)
Amended

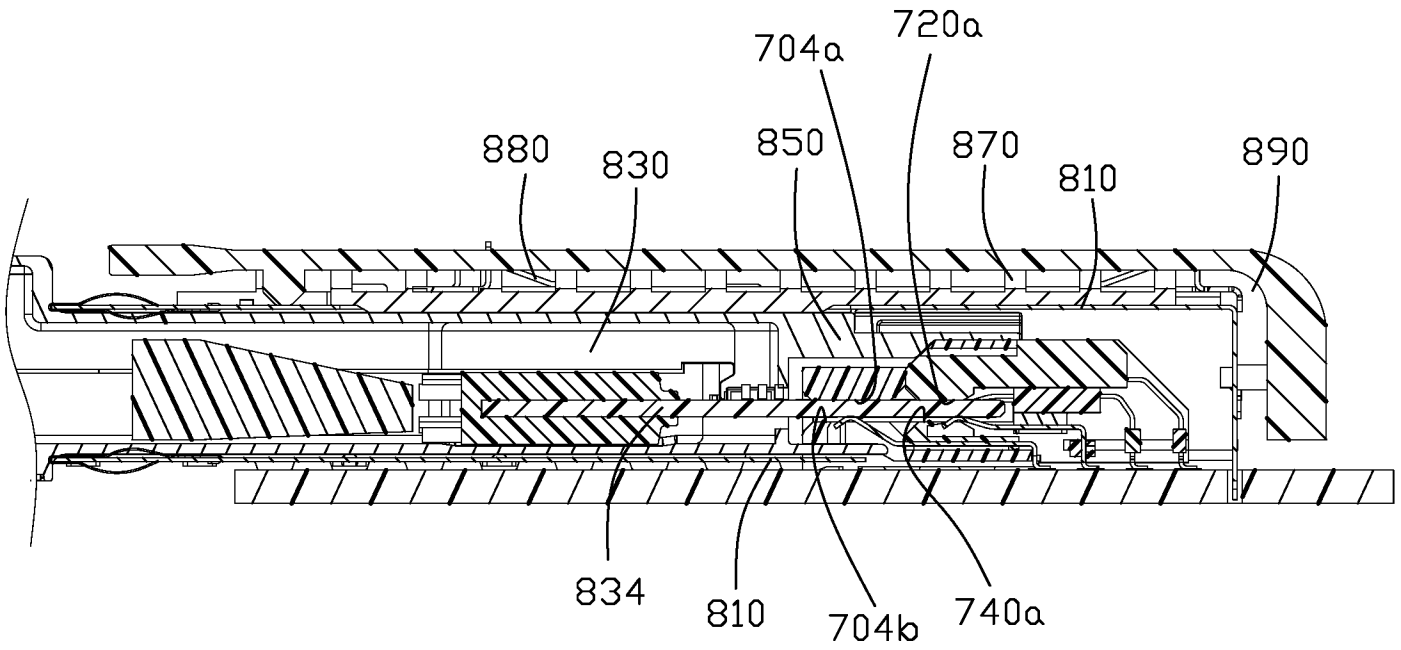
FIG. 31
Amended

ELECTRICAL RECEPTACLE FOR TRANSMITTING HIGH SPEED SIGNAL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*The present application is a reissue application of U.S. Pat. No. 10,367,308, issued Jul. 30, 2019, filed as U.S. application Ser. No. 15/795,234 on Oct. 26, 2017. The Ser. No. 15/795,234 application claims the benefit of U.S. Provisional Application No. 62/412,841 filed Oct. 26, 2016.*

BACKGROUND OF THE INVENTION

1. Field of the Invention

The invention relates to an electrical receptacle, and particularly to the electrical receptacle adapted for transmitting high speed signal.

2. Description of Related Art

Currently high speed electrical connector has a plurality of electrical lanes. Each of the electrical lanes may run at the rate of 25 Gbit/s or 50 Gbit/s. U.S. Pat. No. 8,764,464, issued to Buck et al., on Jul. 1, 2014, discloses example electrical connectors including a plurality of electrical contacts configured to communicate between electrical devices. The plurality of electrical contacts includes a plurality of ground contacts. A ground coupling assembly is configured to electrically connect ground contacts of an electrical connector to adjust a performance characteristic of the electrical connector as desired.

U.S. Pat. No. 7,798,820, issued on Sep. 21, 2010, discloses an optical transceiver module including an edge connector and a female host connector. The female host connector includes a row of first terminals having first contact sections, a row of second terminals having second contact sections, a row of third terminals having third contact sections and a row of the fourth terminal having fourth contact sections. The first contact section forwardly extends beyond the second contact section. The fourth terminal is in front of the third terminal. The edge connector includes a mating circuit board, the mating circuit board defines a number of contact pads on top of board and bottom of board. The contact pads includes a row of first pads and a row of second pads on the top of board, a row of third of pads and a row of fourth pads on the bottom of board. The first contact section connects with the first pad, the second contact section connects with the second pad, the third contact section connects with the third pad, and the fourth contact section connects with the fourth pad.

U.S. Pat. No. 8,727,793, issued on May 20, 2014, discloses a small SFP board with an end portion configured to be insert into a connector device. The SFP board has a first set of signal pads and a fourth set of signal pads on top surface, a second set of signal pads and a third set of signal pads on bottom surface. The fourth set of signal pads are offset in a longitudinal direction from the first set signal pads on the top surface. The third set of signal pads are offset in a longitudinal direction from the second set signal pads on the bottom surface.

An improved better high-frequency performance of the electrical receptacle is desired.

SUMMARY OF THE INVENTION

An object of the present invention, is to provide an electrical receptacle having means to transmit high speed signal.

To achieve the above-mentioned object, an electrical receptacle mounted onto a host board and electrically connecting with a mating electrical circuit board, comprising an insulative housing; and a row of first terminals, a row of second terminals, a row of third terminals, and a row of fourth terminals arranged along a vertical direction and mounted in the insulative housing, the first terminals and the fourth terminals forming a first mating port, the second terminals and the third terminals forming a second mating port, the first mating port forwardly extending beyond the second mating port; wherein the row of first terminals align with the row of second terminals along a up-to-down direction, the row of third terminals align with the row of fourth terminals along an up-to-down direction, the first terminals and the second terminals are offset in a longitudinal direction from the third terminals and the fourth terminals.

Another object of the present invention, is to provide an electrical receptacle having means to transmit high speed signal.

To achieve the above-mentioned object, an electrical receptacle for mating with a plug connector, comprising an insulative housing defining a front card receiving space and a rear module receiving space; a terminal module received within the module receiving space and comprising an upper half module and a lower half module stacked with each other in a vertical direction; said upper half module including an upper front part and an upper rear part cooperating with each other to sandwich an upper shielding plate therebetween in the vertical direction, the upper front part including a plurality of upper front terminals integrally formed with an upper front insulator via insert-molding, the upper rear part including a plurality of upper rear terminals integrally formed with an upper rear insulator via insert-molding, said upper shielding plate forming a plurality of upper springs extending upwardly through corresponding holes in the upper front insulator to mechanically and electrically connect corresponding upper front terminals for grounding, and a plurality of lower springs extending downwardly through corresponding holes to mechanically and electrically connect corresponding upper rear terminals for grounding; wherein front contacting sections of the upper front terminals and those of the upper rear terminals are located on a same upper side of the card receiving space.

Other objects, advantages and novel features of the invention will become more apparent from the following detailed description when taken in conjunction with the accompanying drawings.

BRIEF DESCRIPTION OF THE DRAWINGS

FIG. 5 is a perspective view of a first embodiment of the electrical receptacle according to the present invention;

FIG. 6 is a part of exploded view of the electrical receptacle as shown in FIG. 5;

FIG. 8 is a left view of the terminal modules;

FIG. 11 is an exploded view of the four terminal modules;

FIG. 14 is a cross-section view of the electrical receptacle tacked along line 14-14 of FIG. 5;

FIG. 15 is a cross-section view of the electrical receptacle tacked along line 15-15 of FIG. 5;

FIG. 22(A) is a downward further exploded perspective view of the terminal module of the electrical receptacle of FIG. 21(A);

FIG. 22(B) is an upward further exploded perspective view of the terminal module of the electrical receptacle of FIG. 22(A);

FIG. 24(A) is a cross-sectional view of the unassembled electrical receptacle of FIG. 17(A), taken in a vertical plane extending in a front-to-back direction where the terminals of the upper part of the terminal module are located;

FIG. 24(B) is a cross-sectional view of the unassembled electrical receptacle of FIG. 17(A), taken in another vertical plane extending in a front-to-back direction where the terminals of the lower part of the terminal module are located;

FIG. 25(A) is a cross-sectional view of the assembled electrical receptacle of FIG. 17(A), taken in a vertical plane extending in a front-to-back direction where the terminals of the upper part of the terminal module are located;

FIG. 25(B) is a cross-sectional view of the assembled electrical receptacle of FIG. 17(A), taken in another vertical plane extending in a front-to-back direction where the terminals of the lower part of the terminal module are located;

FIG. 31 is a cross-sectional view of the assembled plug connector and receptacle of FIG. 26(A).

DETAILED DESCRIPTION OF THE PREFERRED EMBODIMENT

Figure 1:
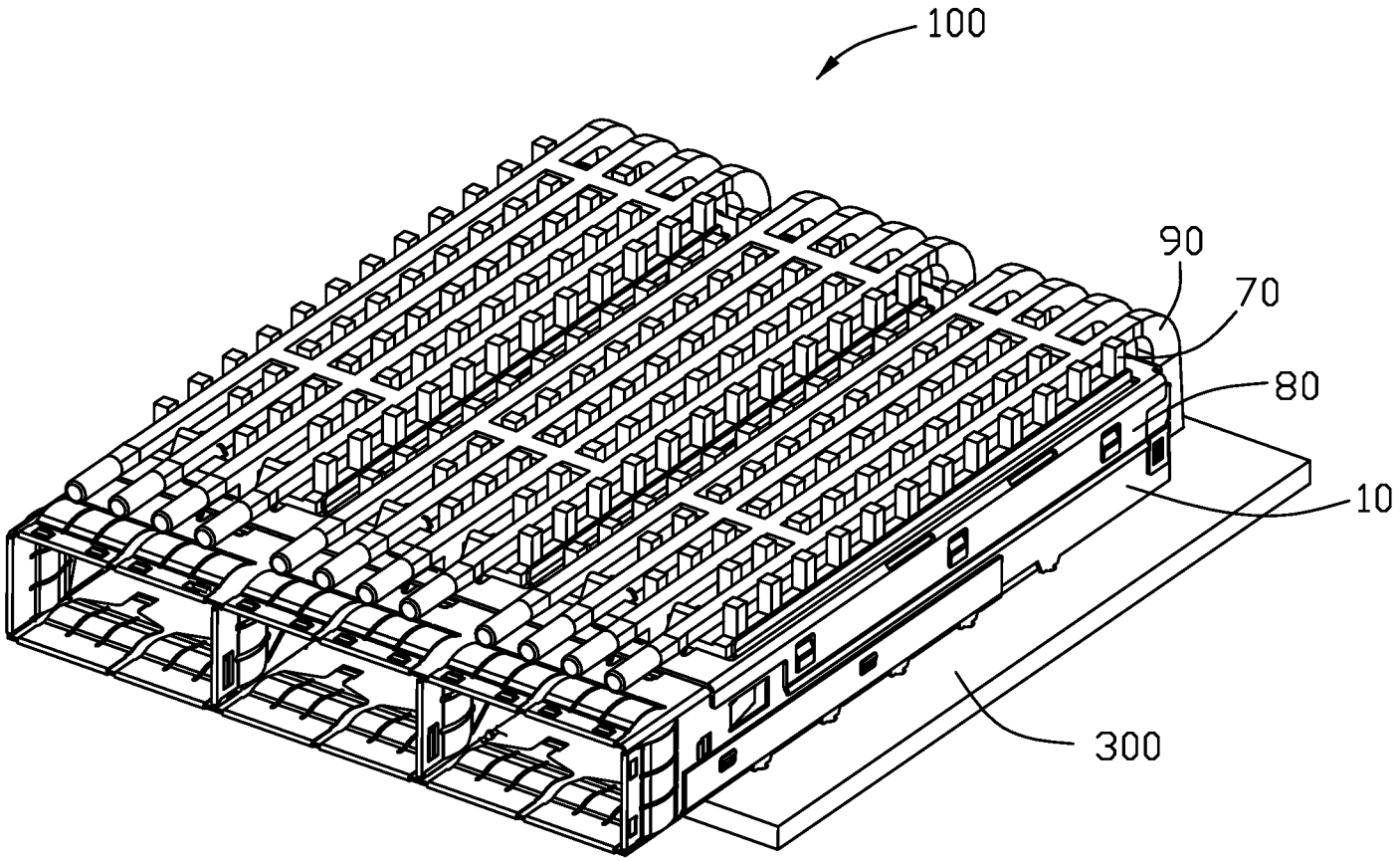
FIG. 1 is a perspective view of an electrical connector assembly according to the present invention.
Figure 2:
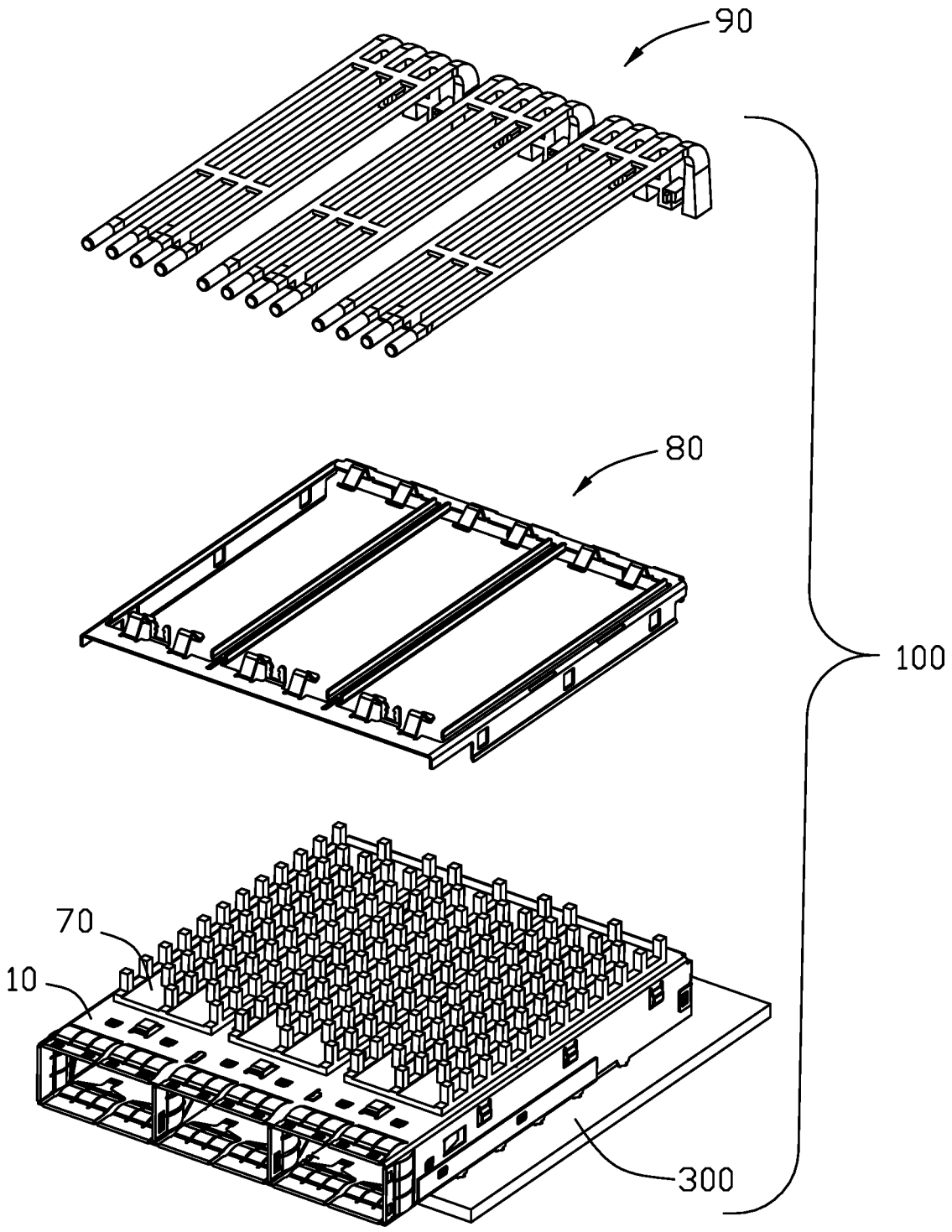
FIG. 2 is a part of exploded view of the electrical connector assembly as shown in FIG. 1.
Figure 3:
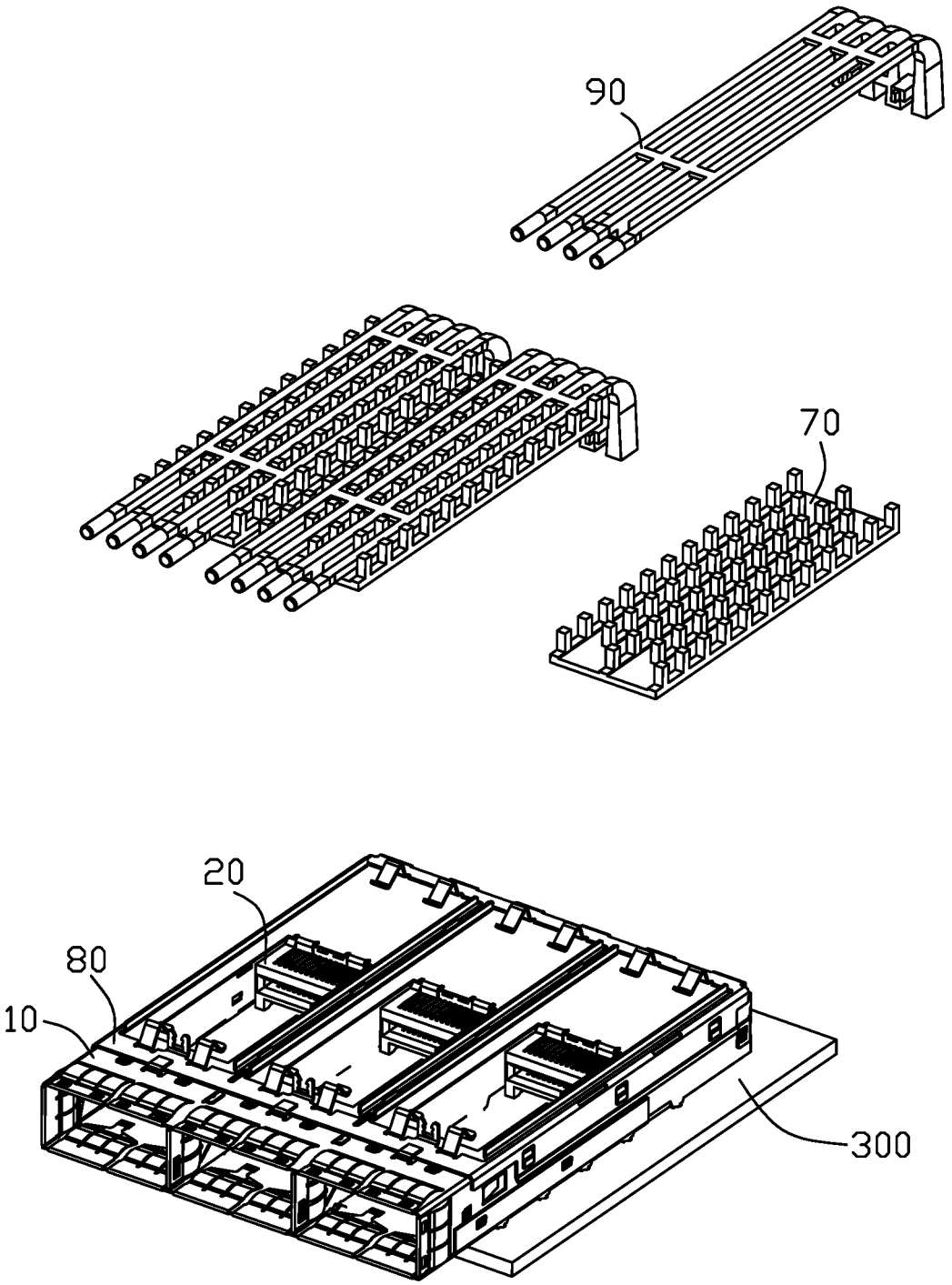
FIG. 3 is another part of exploded view of the electrical connector assembly as shown in FIG. 1.
Figure 4:
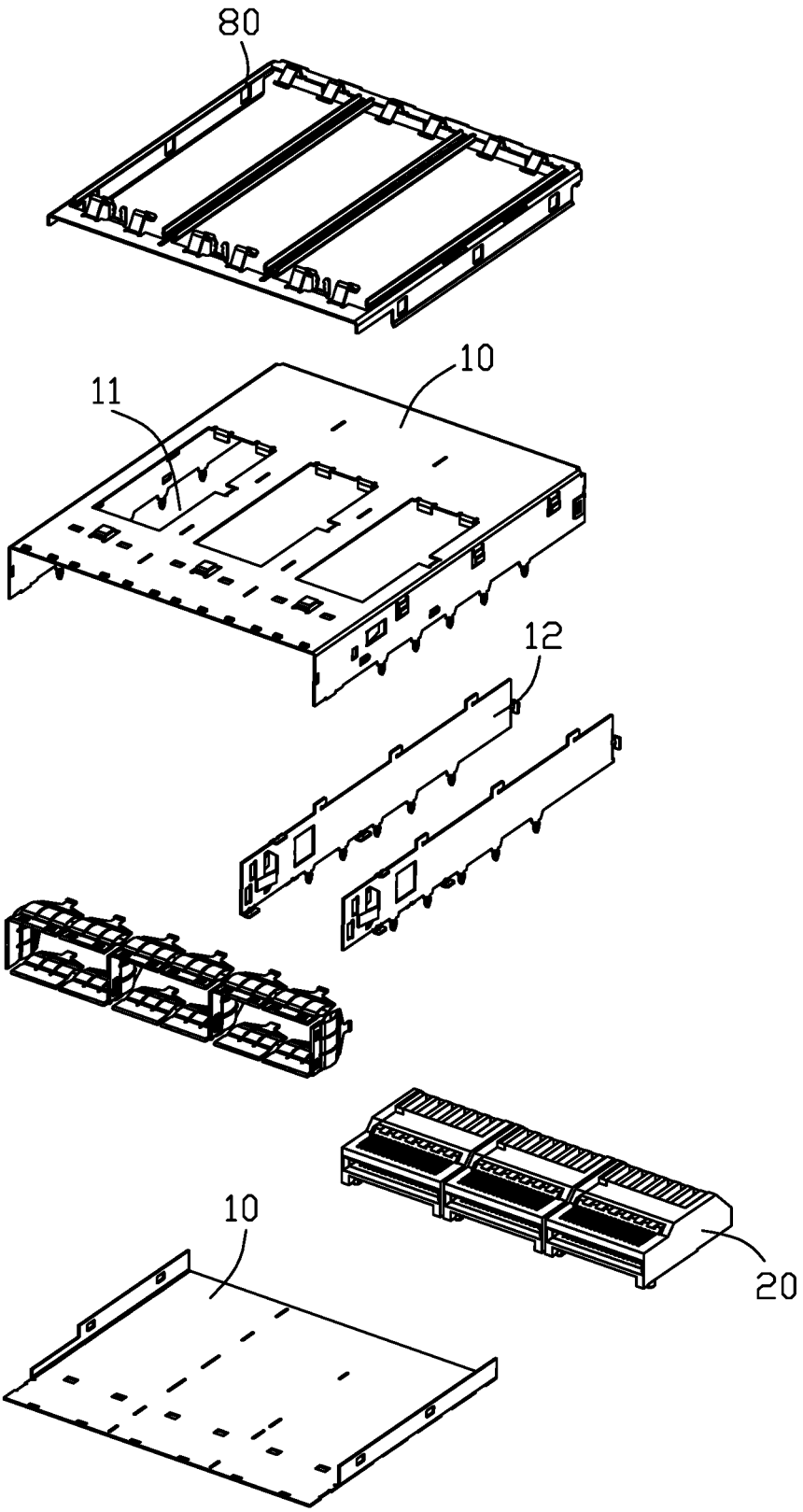
FIG. 4 is an exploded view of the electrical connector assembly as shown in FIG. 1.
Figure 7:
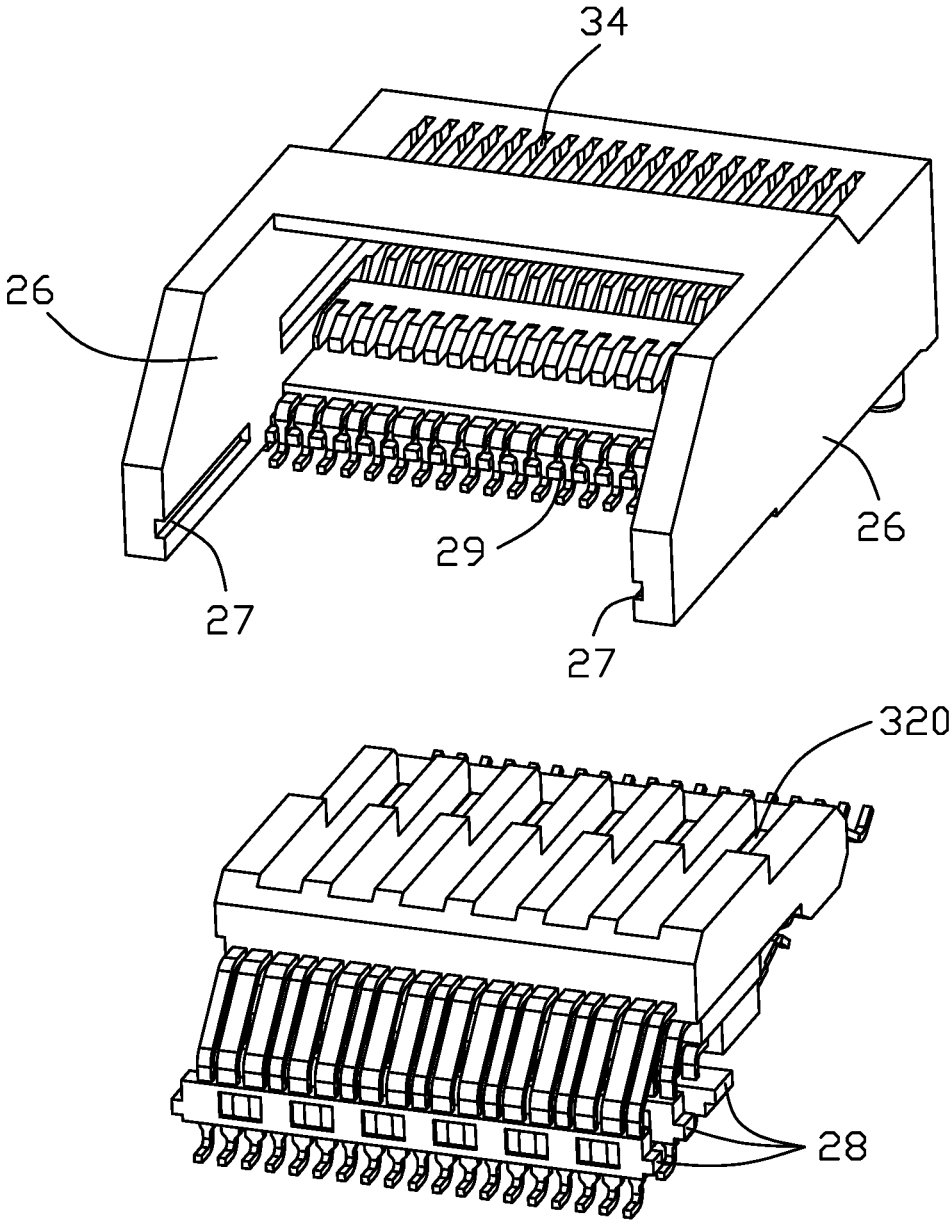
FIG. 7 is another part of exploded view of the electrical receptacle as shown in FIG. 5.
Figure 9:
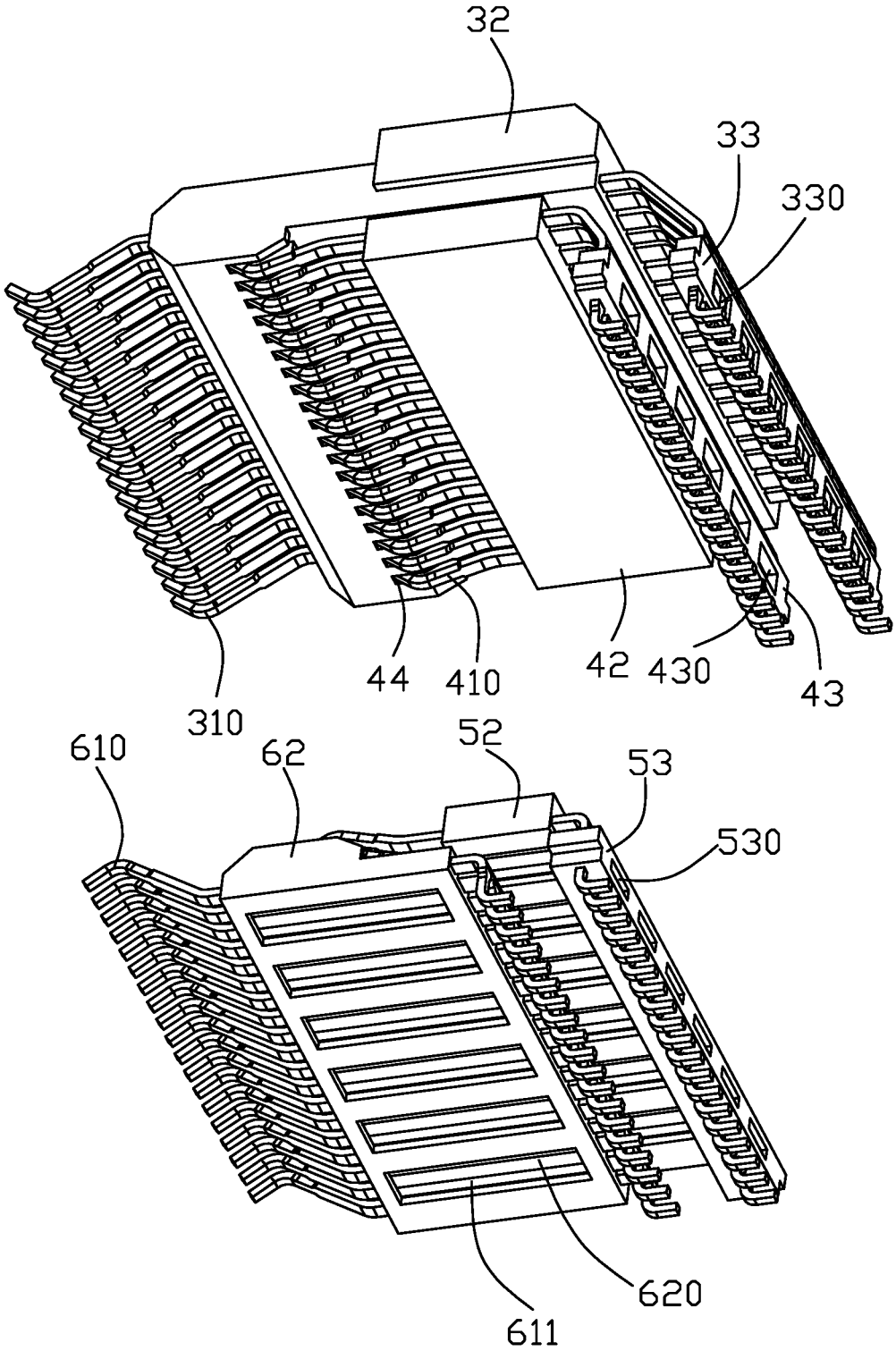
FIG. 9 is a perspective view of second contact section of second terminal receiving in second guide groove and third contact section of third terminal receiving in third guide groove.
Figure 10:
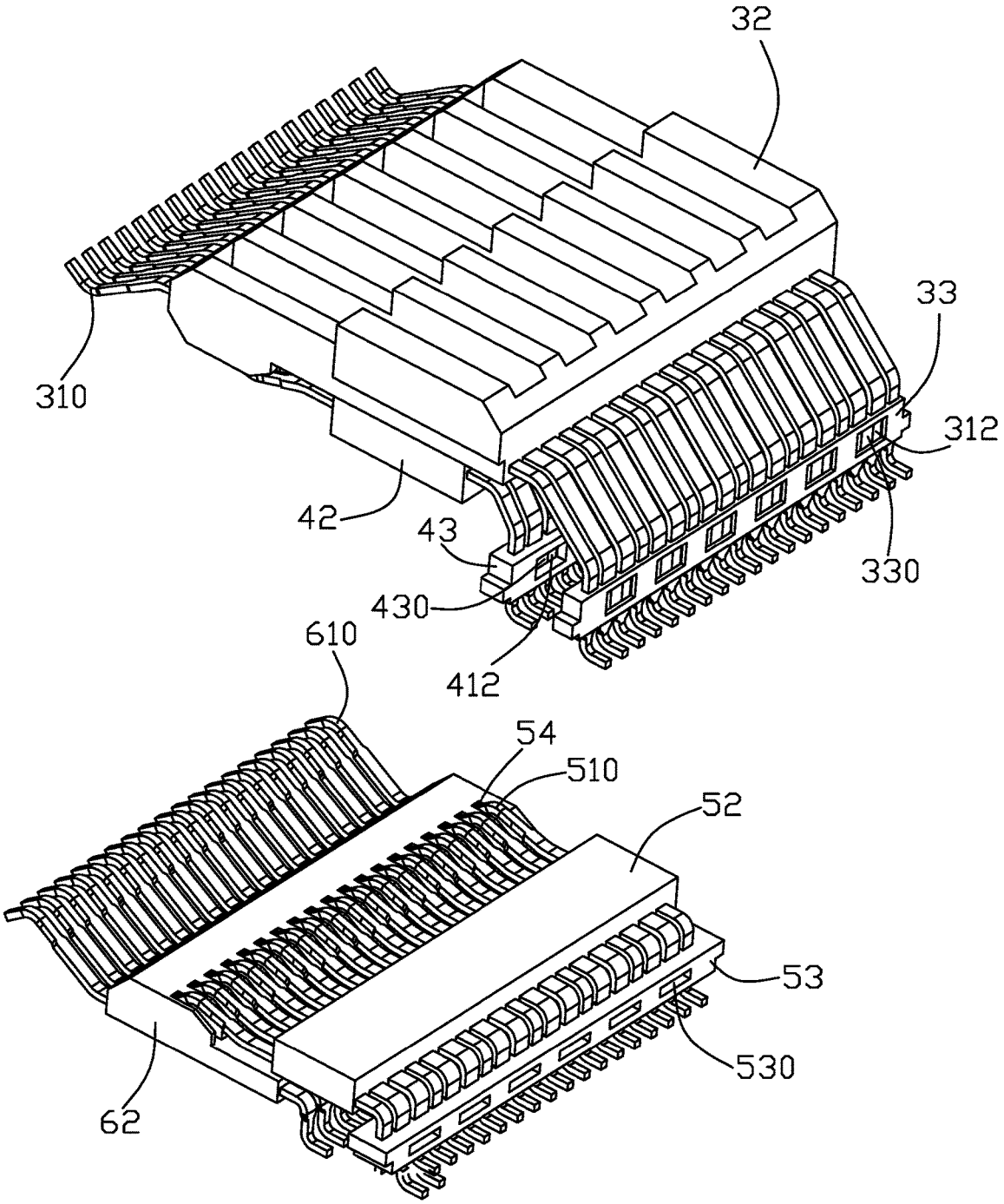
FIG. 10 is another perspective view of the second contact section of the second terminal receiving in the second guide groove and the third contact section of the third terminal receiving in the third guide groove as shown in FIG. 9.

Reference will now be made in detail to the preferred embodiment of the present invention. Referring to FIGS. 1-6, an electrical connector assembly 100 includes a shielding shell or cage 10, a number of first embodiment of electrical receptacles 200 mounted onto a host board 300 and electrically connecting with mating electrical circuit boards. The electrical receptacle 200 includes an insulative housing 20, and a number of terminal modules mounted in the insulative housing 20. The terminal modules include a first terminal module 30, a second terminal module 40, a third terminal module 50, and a fourth terminal module 60 arranging along an up-to-down direction. A shielding plate 12 is set between two adjacent insulative housings 20. The shielding shell 10 defines holes 11 on top face. The electrical connector assembly 100 further includes heat sinks 70 mounted in the holes 11, a retainer 80 fastening the whole heat sinks 70 on the shielding shell 10, and a number of light pipe 90 mounted on the heat sinks 70.

Referring to FIGS. 5-8, the first terminal module 30 includes a top row of first terminals 31, a first insulative body 32 over-molded on the first terminal 31, and a first position part 33 over-molded on the first terminal 31. The second terminal module 40 includes a row of second terminal 41 under the first terminal 31, a second insulative body 42 over-molded on the second terminal 41, and a second position part 43 over-molded on the second terminal 42. The third terminal module 50 includes a row of third terminals 51 under the second terminal 41, a third insulative body 52 over-molded on the third terminal 51, and a third position part 53 over-molded on the third terminal 51. The fourth terminal module 60 includes a row of fourth terminals 61 under the third terminal 51, a fourth insulative body 62 over-molded on the fourth terminals 61. The first and second terminals 31, 41 electrically connect to a top surface of the mating electrical circuit board, the third and fourth terminals 51, 61 electrically connect to a bottom surface of the mating electrical circuit board.

Figure 12:
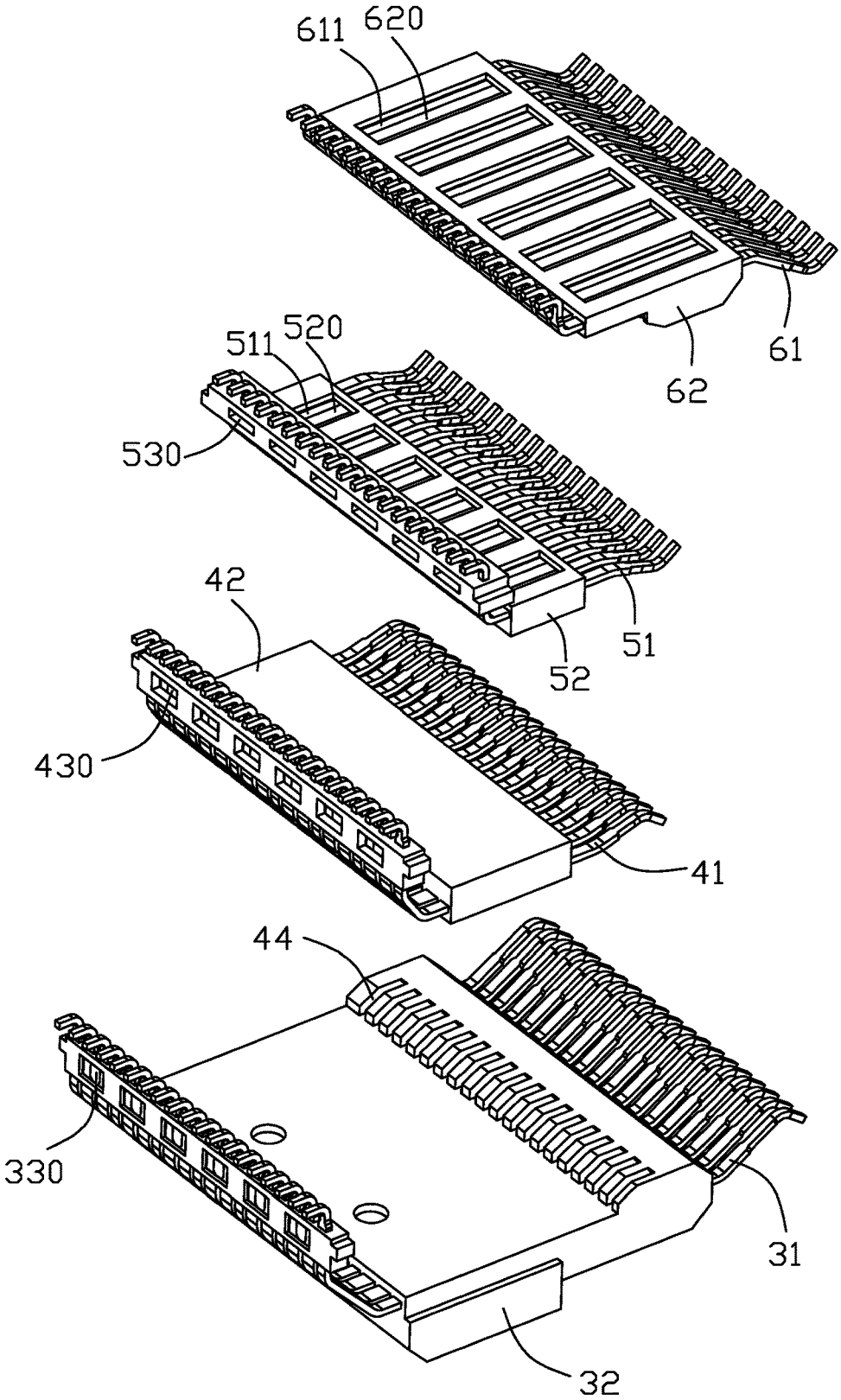
FIG. 12 is another exploded view of the four terminal modules as shown in FIG. 11.
Figure 13:
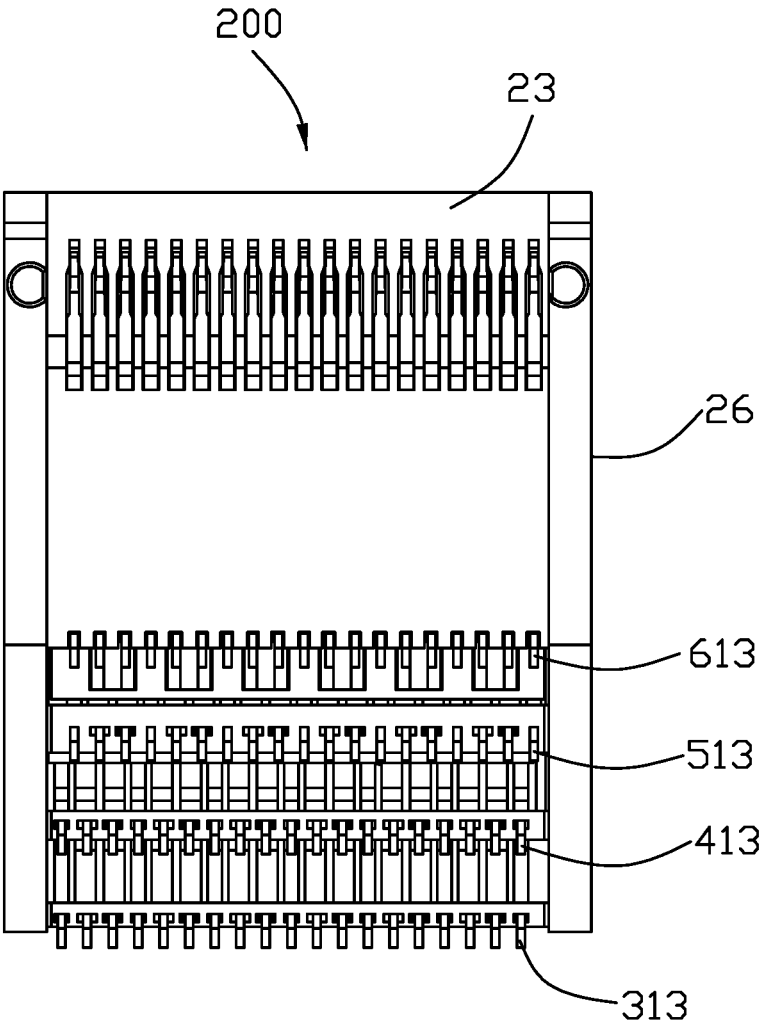
FIG. 13 is an upward view of the terminal modules mounted in the insulative housing.
Figure 16:
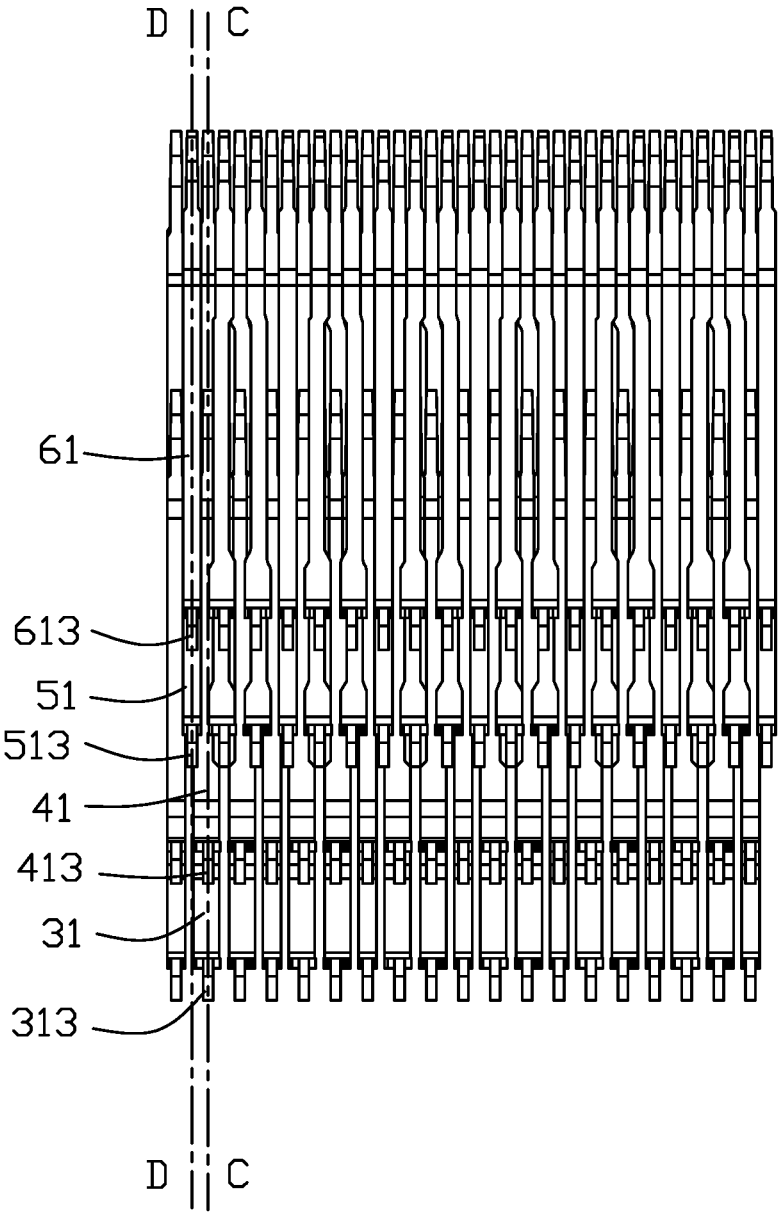
FIG. 16 is a top view of the terminals.
Figure 17A:
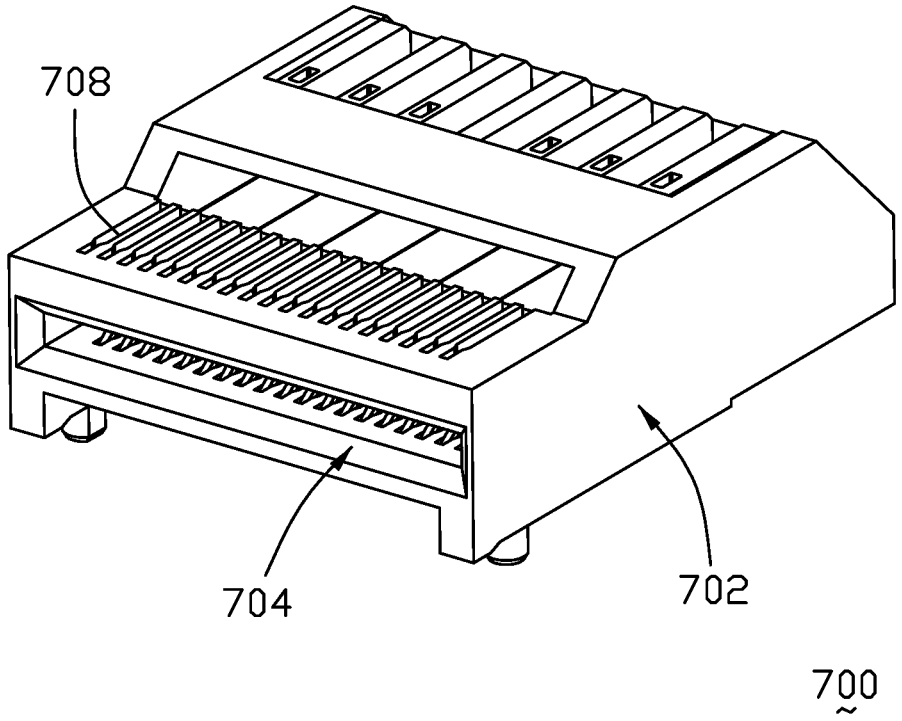
FIG. 17(A) is a downward perspective view of the electrical receptacle according to a second embodiment of the invention.
Figure 17B:
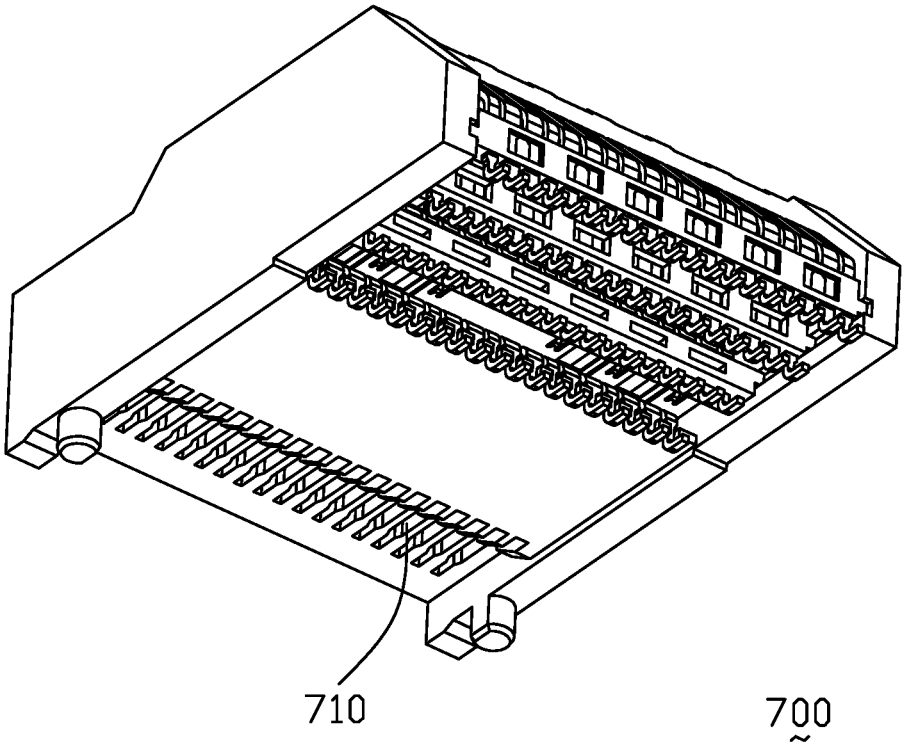
FIG. 17(B) is an upward perspective view of the electrical receptacle of FIG. 17.
Figure 18A:
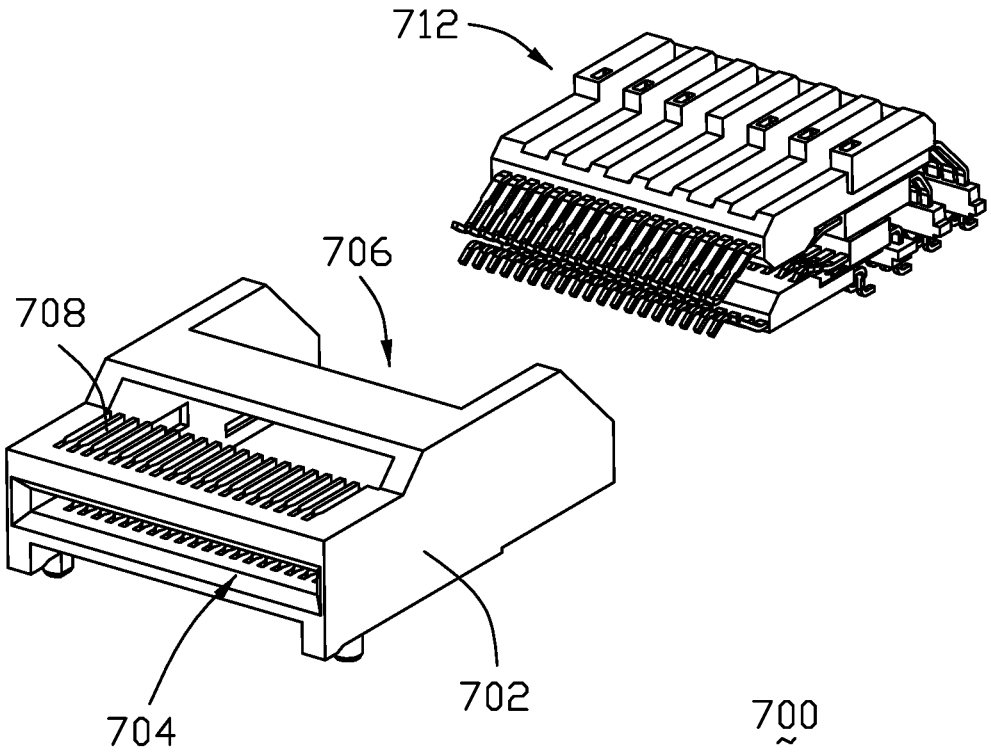
FIG. 18(A) is a downward exploded perspective view of the electrical receptacle of FIG. 17(A)
Figure 18B:
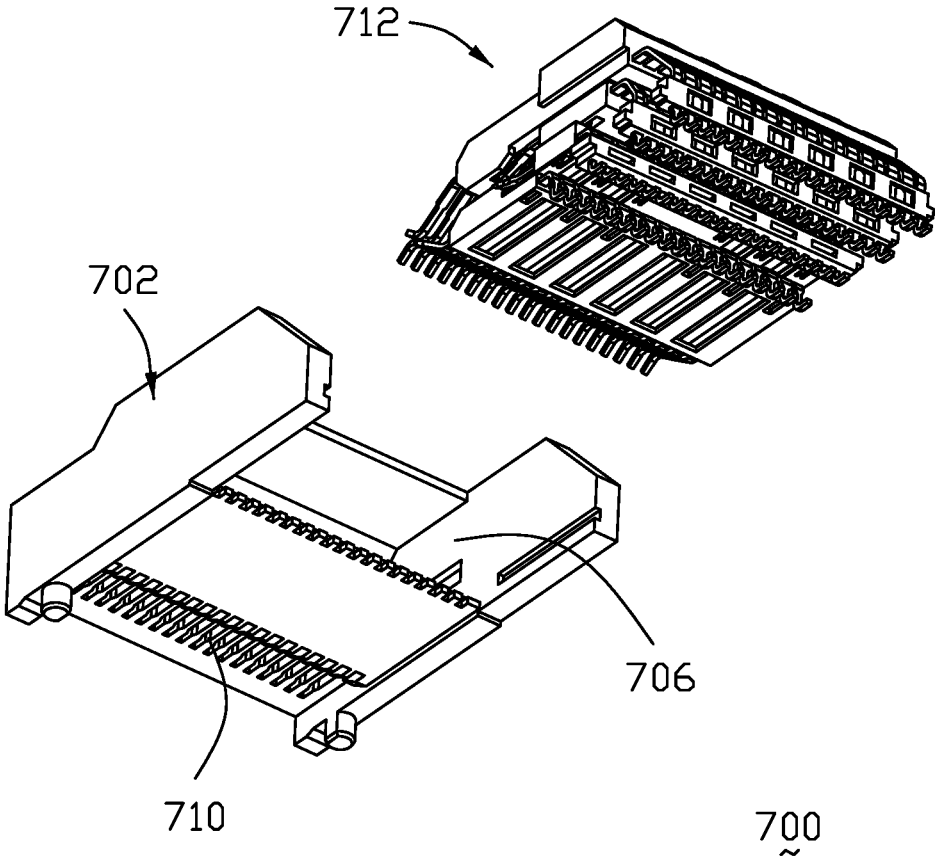
FIG. 18(B) is an upward exploded perspective view of the electrical receptacle of FIG. 18(A)
Figure 19A:
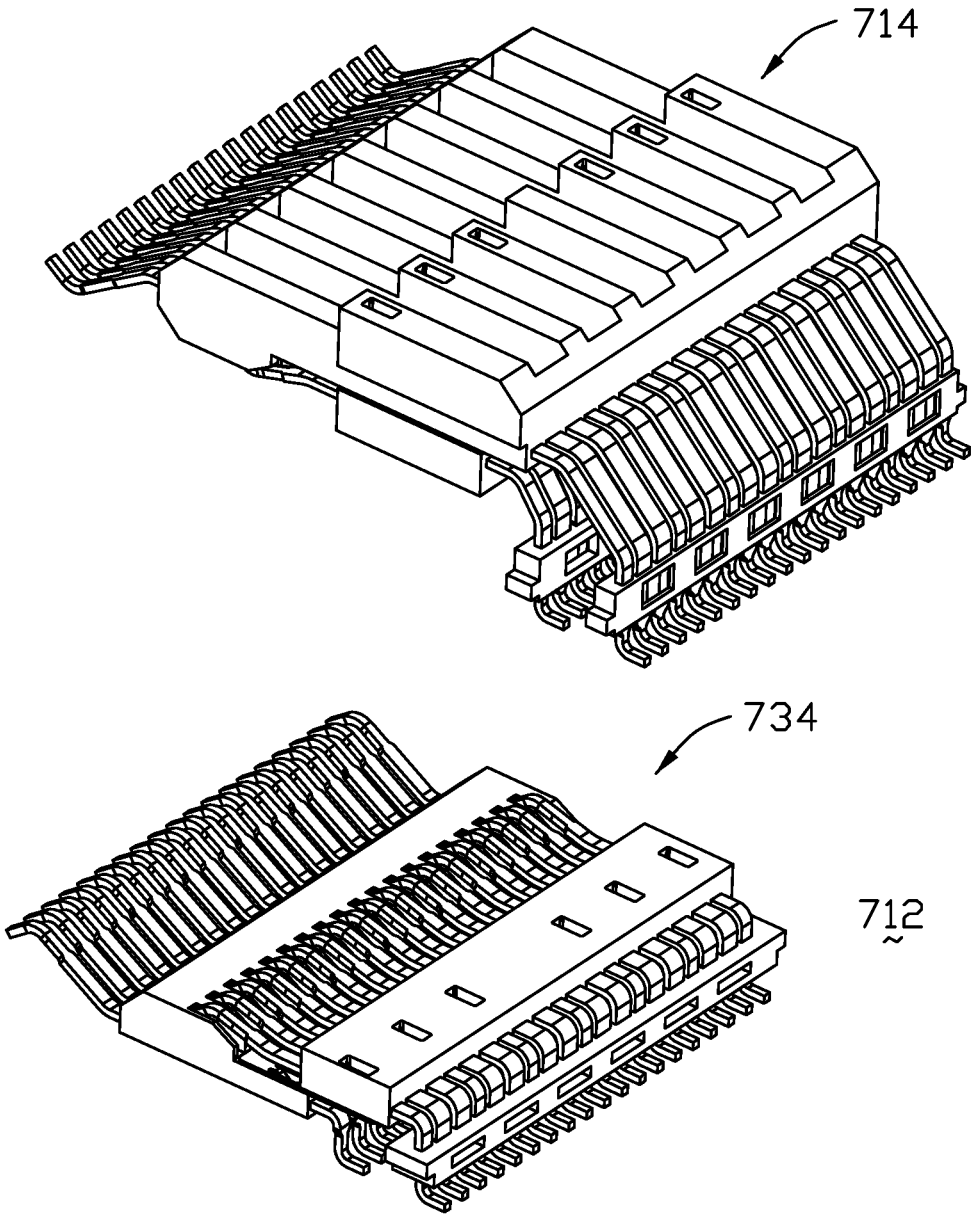
FIG. 19(A) is a downward exploded perspective view of the terminal module of the electrical receptacle of FIG. 18(A)
Figure 19B:
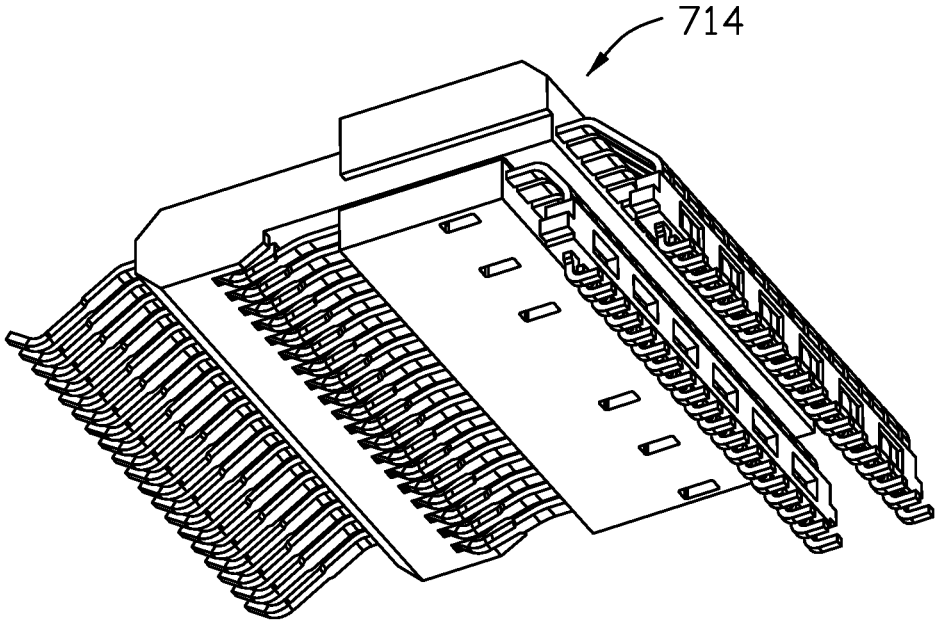
FIG. 19(B) is an upward exploded perspective view of the terminal module of the electric receptacle of FIG. 19(A)
Figure 19B:
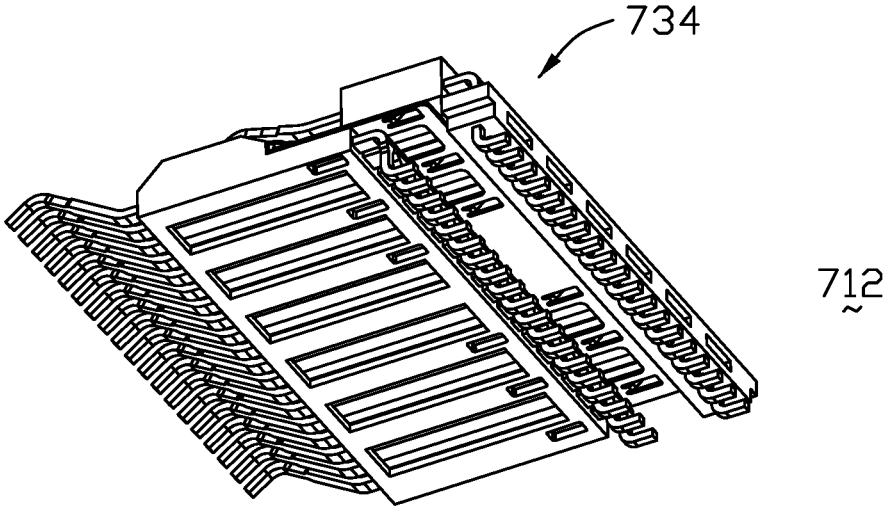
Figure 20:
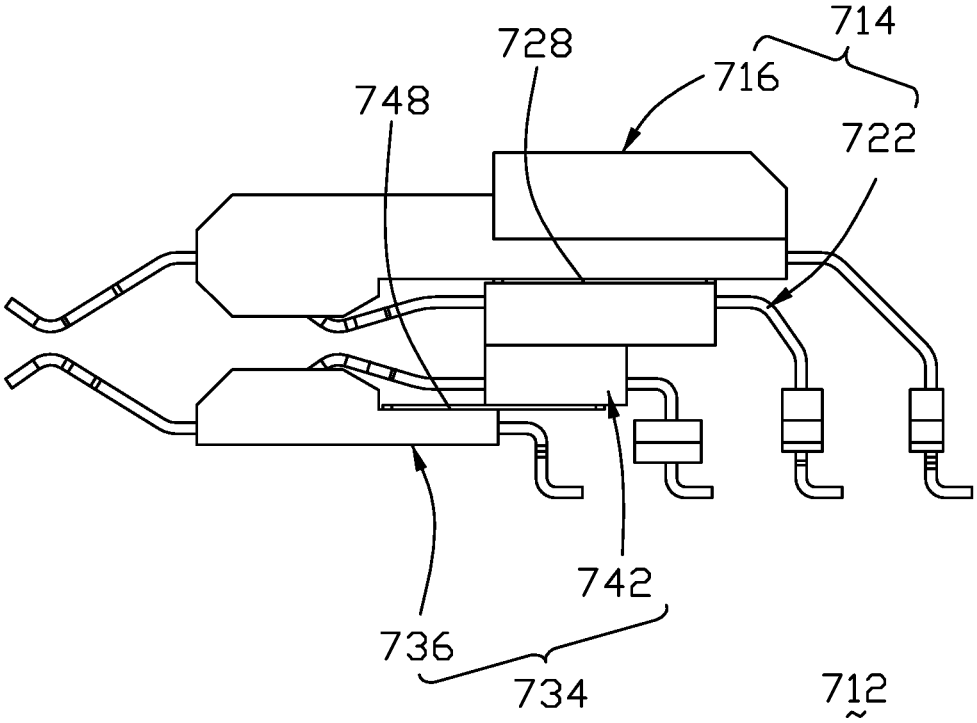
FIG. 20 is a side view of the terminal module of FIG. 19A)
Figure 21A:
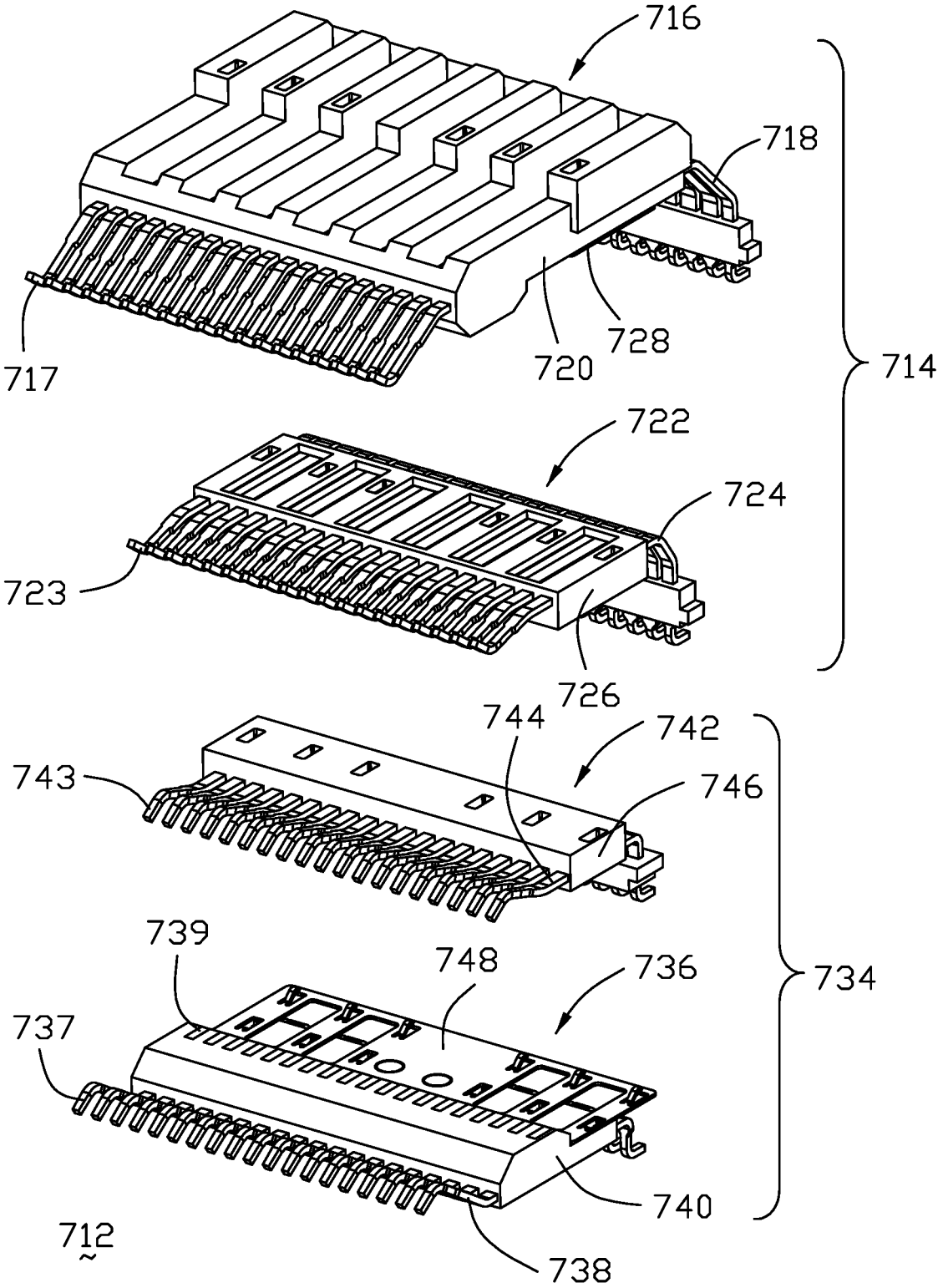
FIG. 21(A) is a downward further exploded perspective view of the terminal module of the electrical receptacle of FIG. 19(A)
Figure 21B:
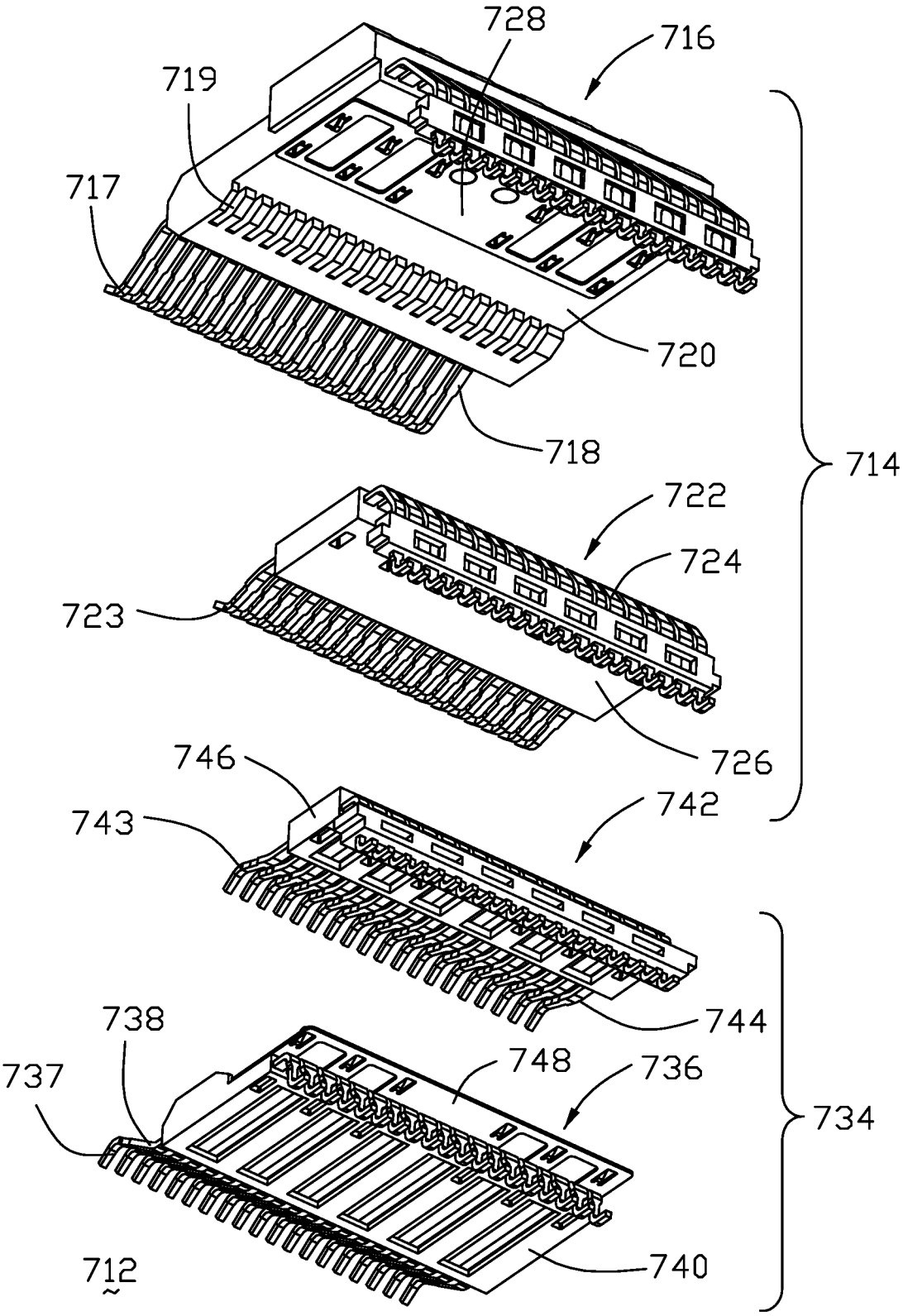
FIG. 21(B) is an upward further exploded perspective view of the terminal module of the electrical receptacle of FIG. 19(B)
Figure 23:
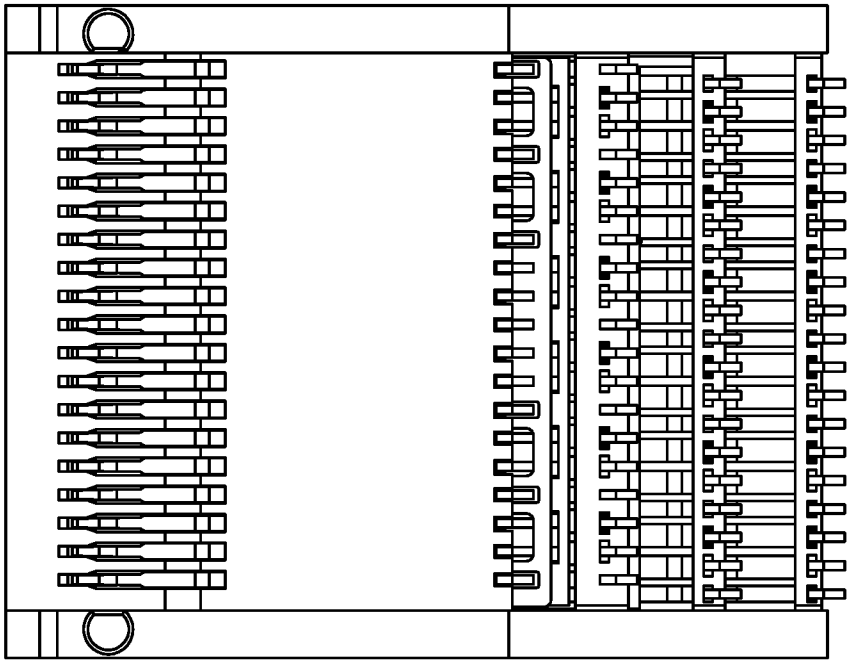
FIG. 23 is a bottom view of the electrical receptacle of FIG. 17(A)
Figure 26A:
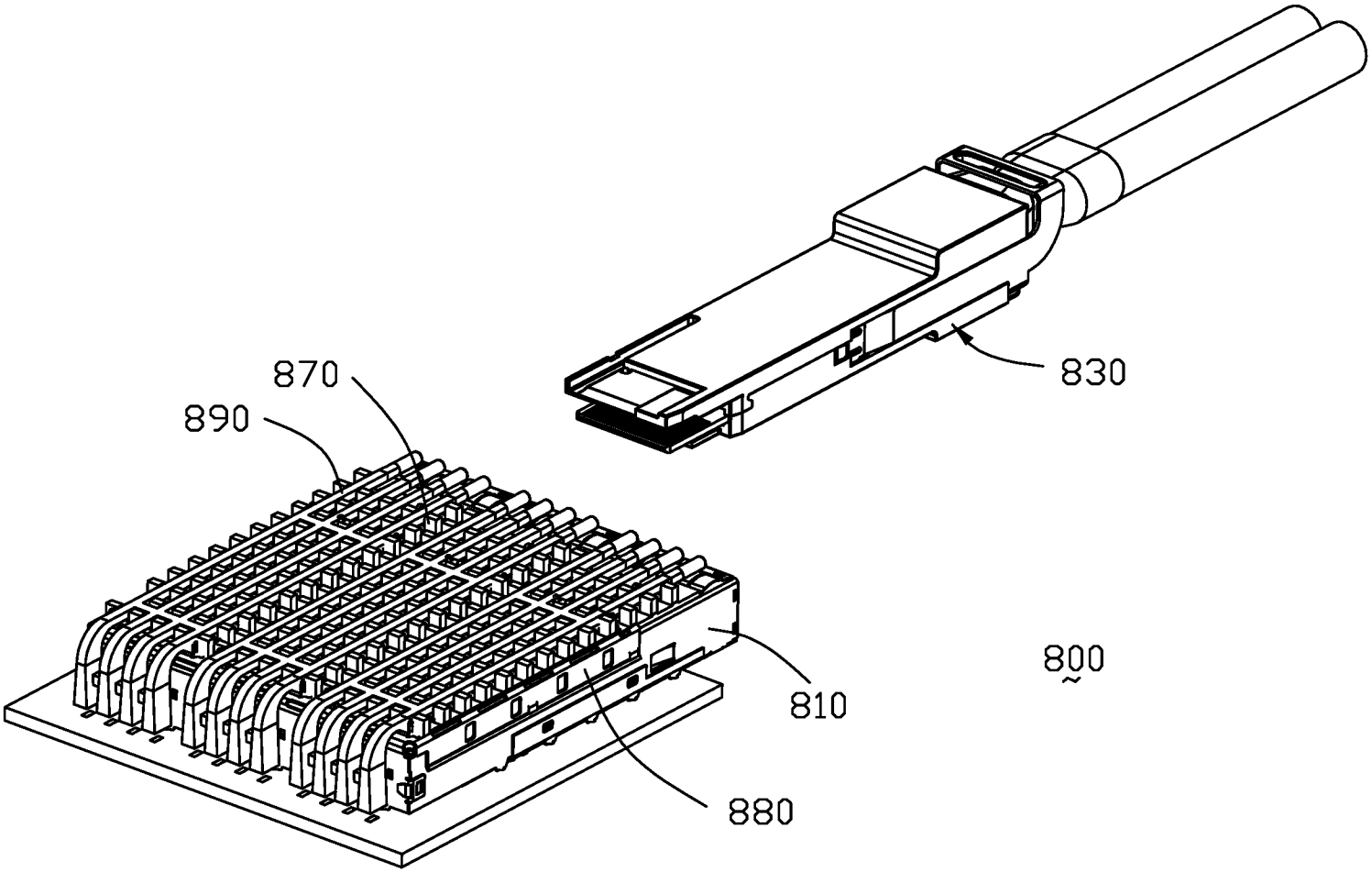
FIG. 26(A) is a perspective view of an electrical connector assembly named QSFP-DD according to the invention, including the electrical receptacle of FIG. 5, and the corresponding plug connector similar to what is disclosed in the previously filed provisional applications mentioned in this disclosure.
Figure 26B:
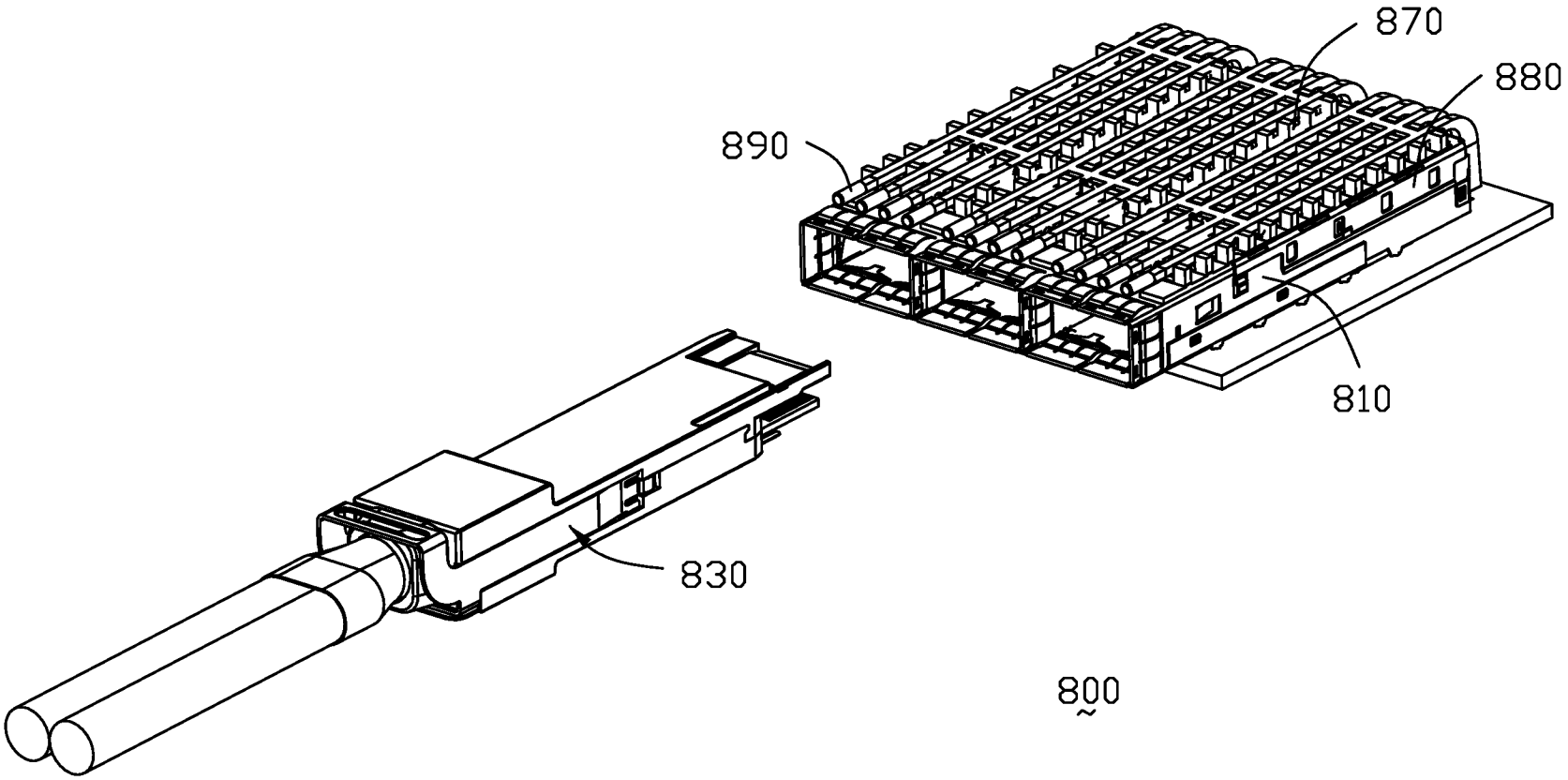
FIG. 26(B) is another perspective view of the electrical connector assembly of FIG. 26(A)
Figure 27:
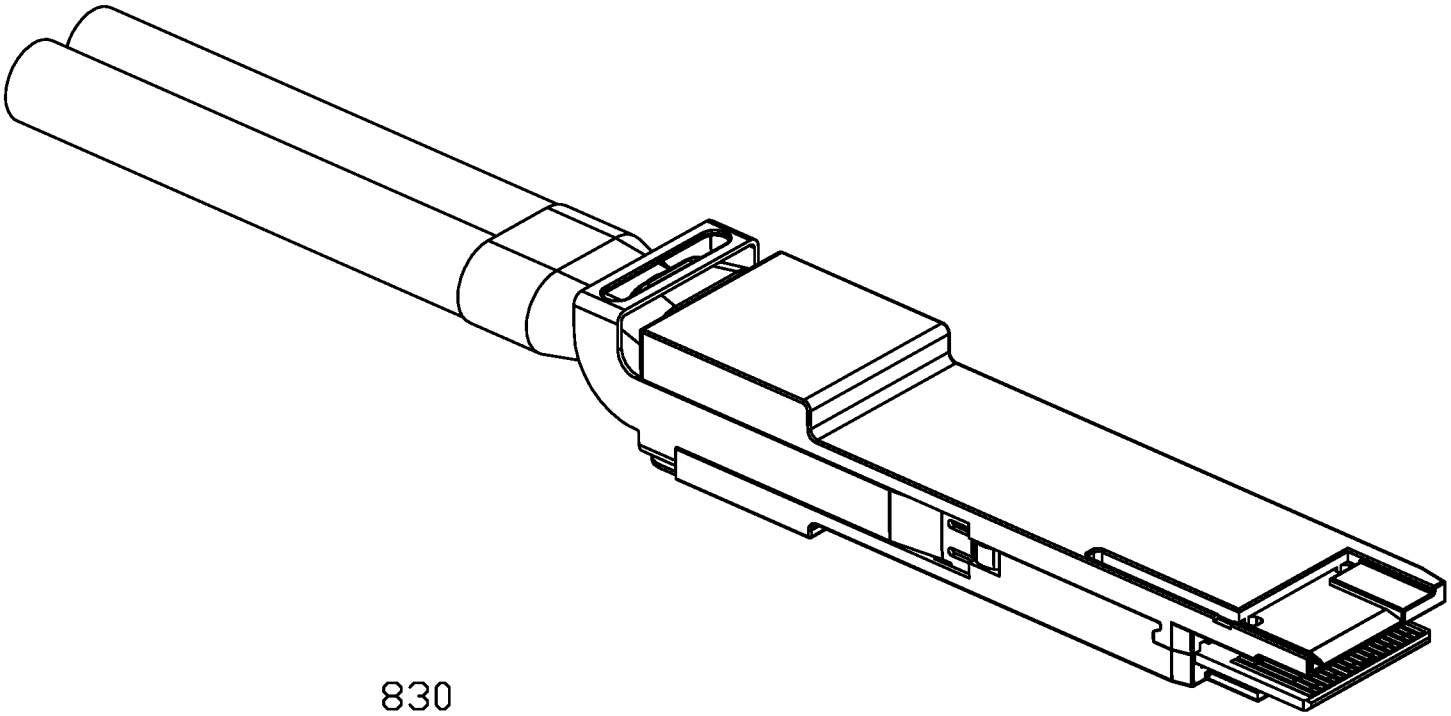
FIG. 27 is a perspective view the plug connector of FIG. 26(A)
Figure 28:
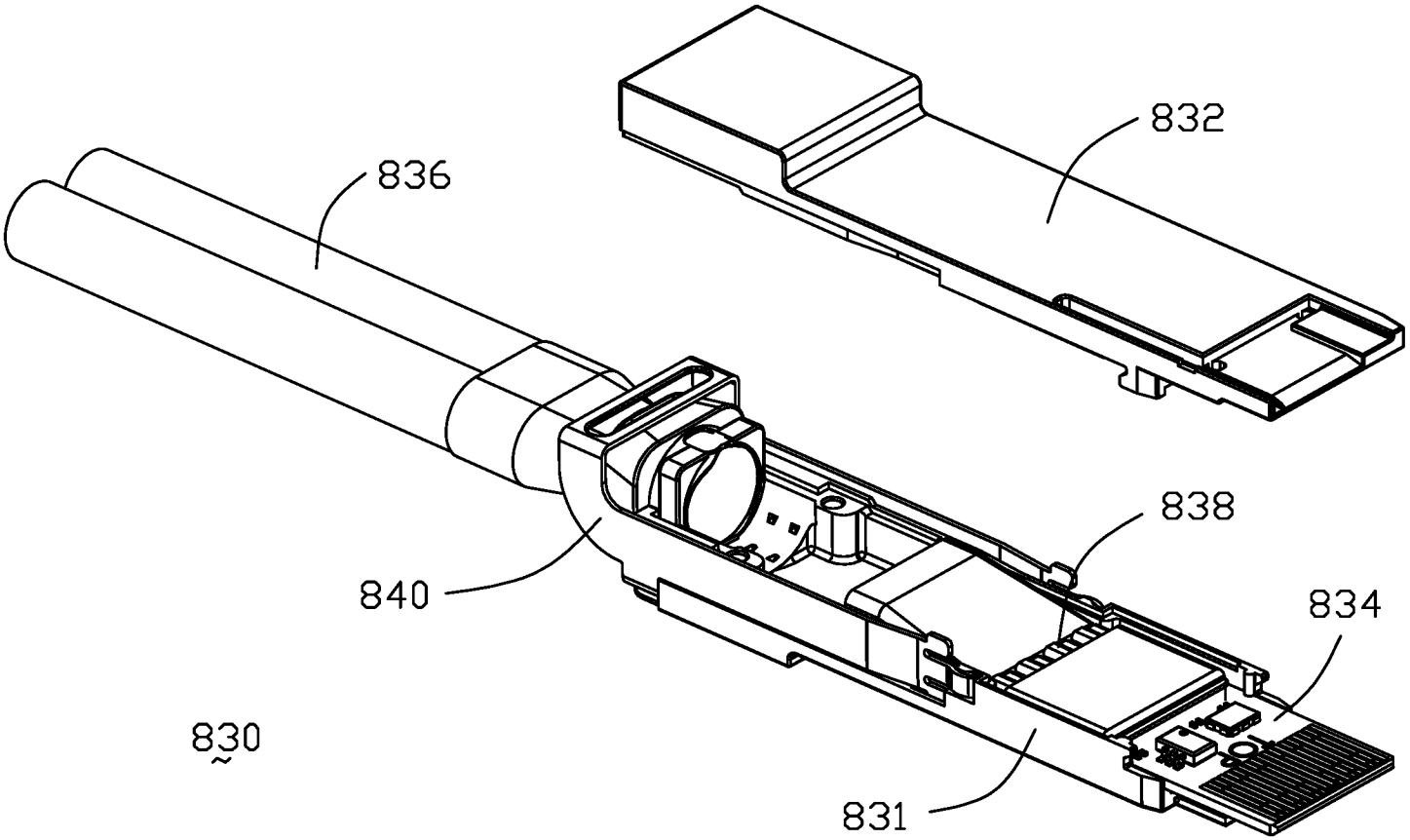
FIG. 28 is an exploded perspective view of the plug connector of FIG. 27.
Figure 29A:
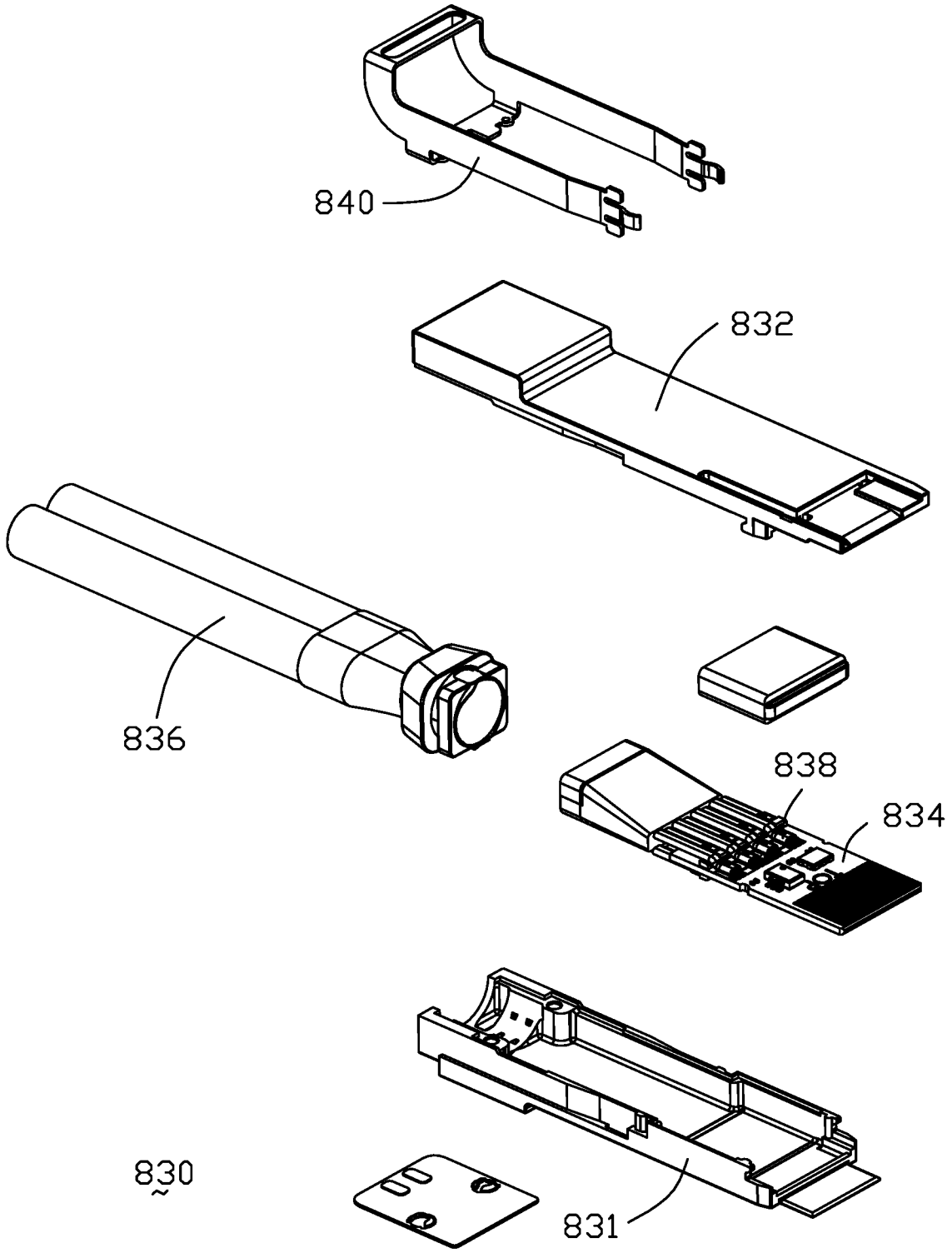
FIG. 29(A) is a further exploded perspective view of the plug connector of FIG. 28.
Figure 29B:
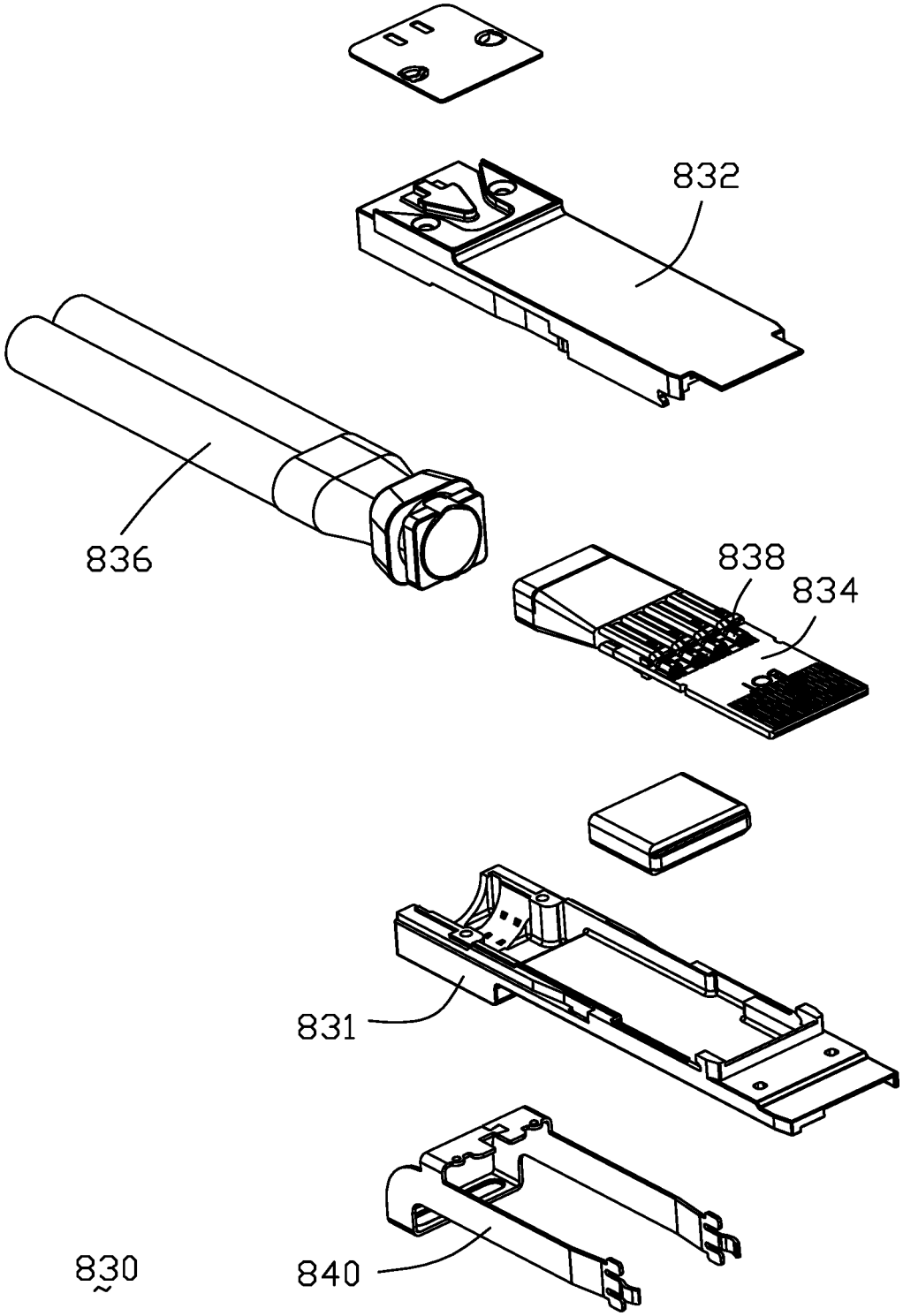
FIG. 29(B) is another further exploded perspective view of the plug connector of FIG. 28.
Figure 30A:
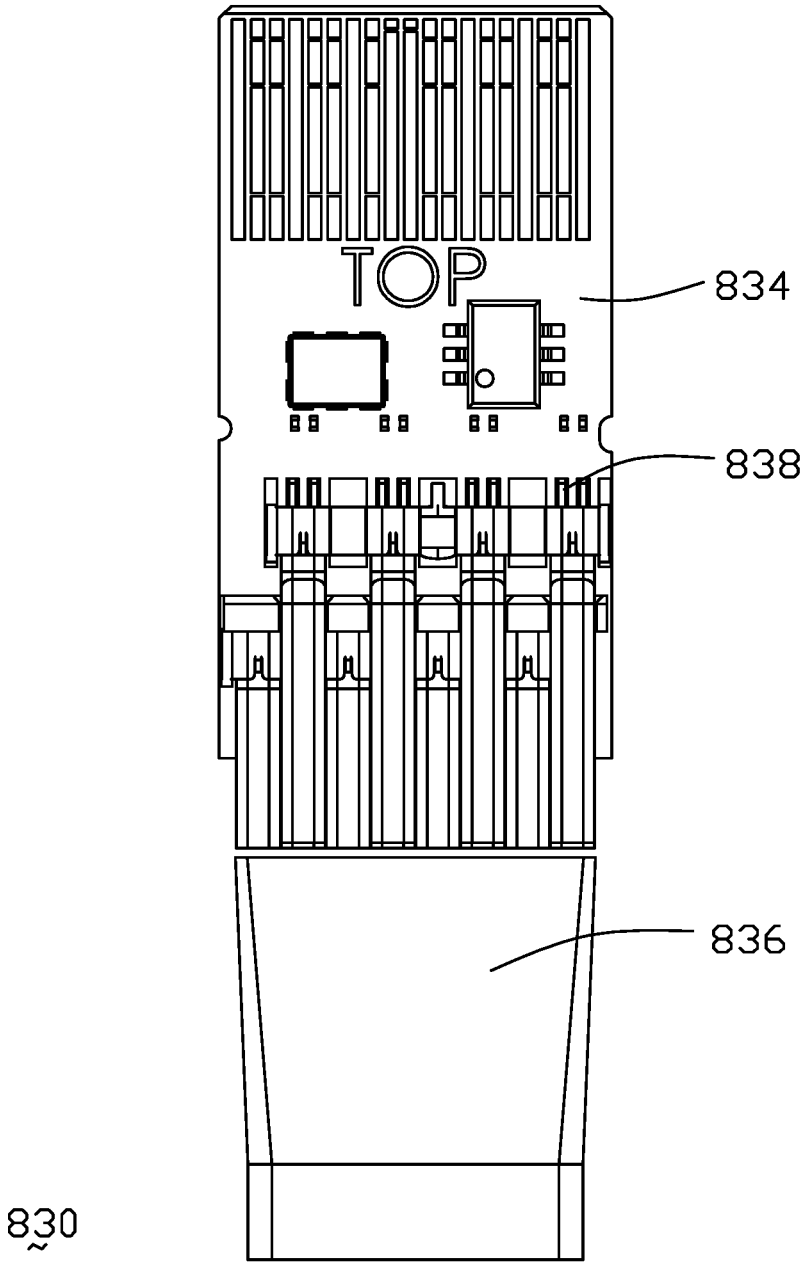
FIG. 30(A) is a top view of the internal printed circuit board of the plug connector of FIG. 27.
Figure 30B:
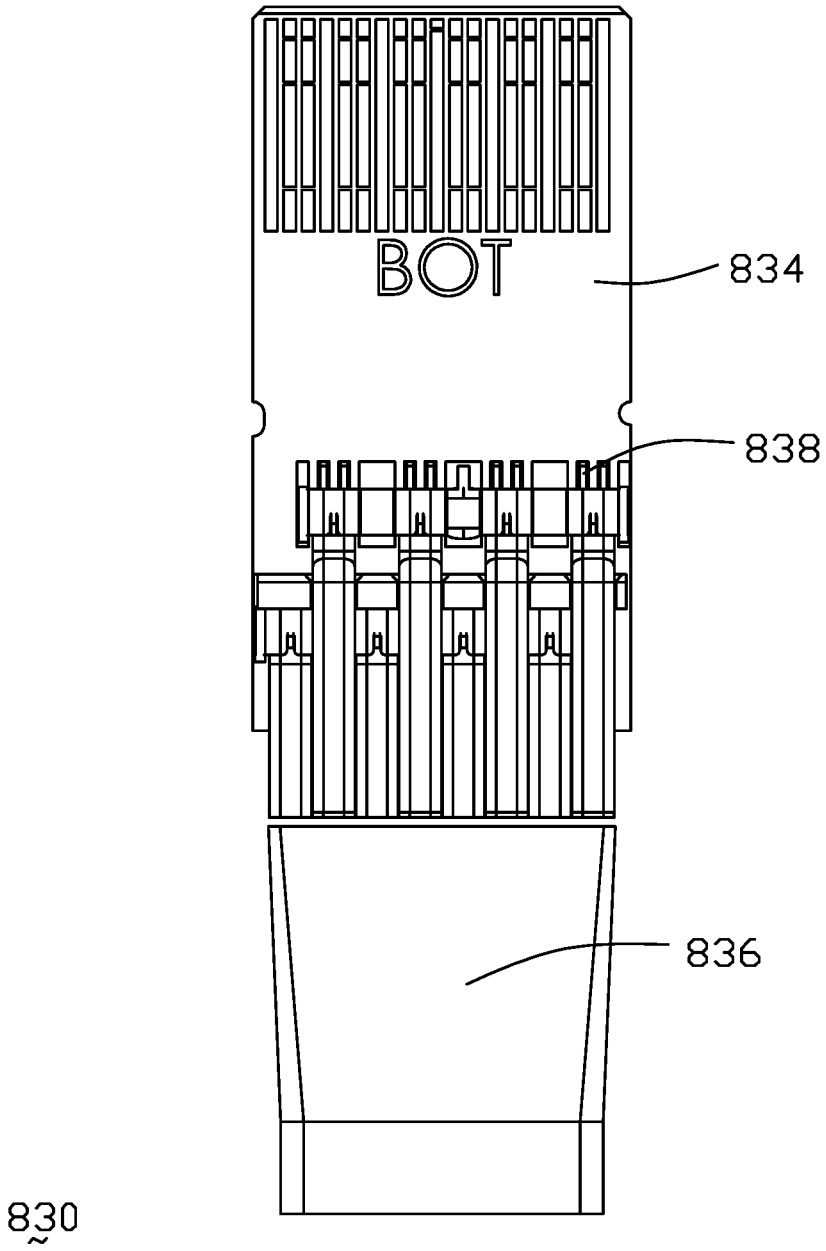
FIG. 30(B) is a bottom view of the internal printed circuit board of the plug connector of FIG. 27.

Referring to FIG. 12, FIGS. 14-15, the first terminal 31 includes a first contact section 310 forwardly extending from the first insulative body 32, a first horizontal section 311 connecting with the contact section 310, a first vertical section 312 perpendicular to the first horizontal section 311, and a first soldering portion 313 perpendicular to the first vertical section 312. *The first horizontal section 311 and the first vertical section 312 are commonly formed as a first body portion integrally connected between the first contact section 310 and the first soldering portion 313.* The first insulative body 32 is over-molded on the first horizontal section 311, the first position part 33 over-molded on the first vertical section 312. The second terminal 41 includes a second contact section 410 forwardly extending from the second insulative body 42, a second horizontal section 411 connecting with the second contact section 410, a second vertical section 412 perpendicular to the second horizontal section 411, and a second soldering portion 413 perpendicular to the second vertical section 412. *The second horizontal section 411 and the second vertical section 412 are commonly formed as a second body portion integrally connected between the second contact section 410 and the second soldering portion 413.* The second insulative body 42 is over-molded on the second horizontal section 411, the second position part 43 over-molded on the second vertical section 412. The third terminal 51 includes a third contact section 510 forwardly extending from the third insulative body 52, a third horizontal section 511 connecting with the third contact section 510, a third vertical section 512 perpendicular to the third horizontal section 511, and a third soldering portion 513 perpendicular to the third vertical section 512. *The third horizontal section 511 and the third vertical section 512 are commonly formed as a third body portion integrally connected between the third contact section 510 and the third soldering portion 513.* The third insulative body 52 is over-molded on the third horizontal section 511, the third position part 53 over-molded on the third vertical section 512. The fourth terminal 61 includes a fourth contact section 610 forwardly extending from the fourth insulative body 62, a fourth horizontal section 611 connecting with the fourth contact section 610, a fourth vertical section 612 perpendicular to the fourth horizontal section 611, and a fourth soldering portion 613 perpendicular to the fourth vertical section 612. *The fourth horizontal section 611 and the fourth vertical section 612 are commonly formed as a fourth body portion integrated connected between the fourth contact section 610 and the fourth soldering portion 613.* The fourth insulative body 62 is over-molded on the fourth horizontal section 611.

Referring to FIGS. 5-7, FIGS. 9-12, the insulative housing 20 includes a mating face 21, a top surface 22 and a bottom surface 23. The top surface 22 defines a row of first guide grooves 34 for [received] *receiving* the first contact section 310. The bottom surface 23 defines a row of fourth guide grooves 64 for [received] *receiving* the fourth contact section 610. The first insulative body 32 defines a row of second guide grooves 44 for [received] *receiving* the second contact section 410 in bottom face. The fourth insulative body 62 defines a row of third guide groove 54 for [received] *receiving* the third contact section 510. The first contact section 310 and the fourth contact section 610 forwardly extend beyond the second contact section 410 and the third contact section 510. The first contact sections 310 of the first terminals 31 and the fourth contact sections 610 of the fourth terminals 61 form a first mating port 24. The second contact sections 410 of the second terminals 41 and the third contact sections 510 of the third terminals 51 form a second mating port 25. The first mating port 24 forwardly extends beyond the second mating port 25. The insulative housing 20 defines a number of fixed slots 29 at rear face of the bottom surface 23, the fourth vertical section 612 received in the fixed slot 29. The first, second, third vertical section 312, 412, 512 are respectively insert-molded in the first, second, third position part 33, 43, 53 in a whole row. These designs are in order to that the first, second, third, fourth soldering portion 313, 413, 513, 613 are respectively surface welded on the host circuit board 300 easily. The insulative housing 20 also includes two side walls 26 connecting the top surface 22 and the bottom surface 23. Both of the side walls 26 respectively define a position slot 27 on opposite faces. All of the first, the second, and the third position parts 33, 43, 53 define a bump 28 at both ends. The bump 28 is received in the position slot 27 to position the first, the second, and the third soldering portion 313, 413, 513. *As clearly shown in FIGS. 14 and 15, the housing 20 forms a card receiving space 201 between a downward face 221 and an upward face 231 which are opposite to each other in the vertical direction. The first insulative body 32 forms a downward/bottom face 321 horizontally coplanar with the downward face 221, and the fourth insulative body 62 forms an upward/top face 621 horizontally coplanar with the upward face 231. Furthermore, the first insulative body 32 forms a forward chamfered structure 32a directly and intimately downwardly facing the card receiving space 201; the housing 20 forms a rearward chamfered structure 22a, opposite to the forward chamfered structure 32a in the front-to-back direction, directly and intimately downwardly facing the card receiving space 201 too. Similarly, the fourth insulative body 62 forms a forward chamfered structure 62a directly and intimately upwardly facing the card receiving space 201; the housing 20 forms a rearward chamfered structure 23a, opposite to the forward chamfered structure 62a in the front-to-back direction, directly and intimately upwardly facing the card receiving space 201 too.*

The first insulative body 32 defines a number of first slits 320 on top face for exposing the first horizontal sections 311 in air. The first position part 33 defines a number of first openings 330 on rear face for exposing the first vertical sections 312 in air. The second insulative body 42 defines a number of second slits 420 on top face for exposing the second horizontal sections 411 in air. The second position parts 43 defines a number of second openings 430 on rear face for exposing the second vertical sections 412 in air. The third insulative body 52 defines a number of third slits 520 on bottom face for exposing the third horizontal sections 511 in air. The third position parts 53 defines a number of third openings 530 on rear face for exposing the third vertical sections 512 in air. The fourth insulative body 62 defines a number of fourth slits 620 on bottom face for exposing the fourth horizontal sections 611 in air.

Referring to FIGS. 13-16, when the first, second, third, fourth terminal modules 30, 40, 50, 60 are mounted on the insulative housing 20, the first soldering portions 313 are at finial side near to the rear face of the insulative housing 20. At the same time, the second soldering portion 413 is in front of the first soldering portion 313, the third soldering portion 513 is in front of the second soldering portion 413, and the fourth soldering portion 613 is in front of the third soldering portion 513. The row of first soldering portions 313 align with the row of second soldering portions 413 along a front-to-back direction. The row of third soldering portions 513 align with the row of fourth soldering portions 613 along a front-to-back direction. The second soldering portion 413 aligns to a space of two adjacent third soldering portions 513. The row of first terminals 31 align with the row of second terminals 41 along an up-to-down direction, the row of third terminals 51 align with the row of fourth terminals 61 along an up-to-down direction. The first terminals 31 and the second terminals 41 are offset in a longitudinal direction perpendicular to the up-to-down direction and the front-to-back direction from the third terminals 51 and the fourth terminals 61. A center line of the first terminal 31 along a front-to-back direction and a center line of the second terminal 41 along a front-to-back direction are in a same first vertical plane C-C, and a center line of the third terminal 51 along a front-to-back direction and a center line of the fourth terminal 61 along a front-to-back direction are in a same second vertical plane D-D. A distance of adjacent the first vertical plane C-C and the second vertical plane D-D is 0.4 mm. This design of the QSFP-DD makes high-frequency performance of the whole electrical receptacle 200 to be better.

Referring to FIGS. 17(A)-25(B), a second embodiment of the electrical receptacle 700, which is essentially similar to the electrical receptacle 200 in the first embodiment except that a metallic shielding plate is disposed between the first terminal module and the second terminal module with the corresponding first sprint tangs and second spring tangs extending therefrom to contact the corresponding first terminals and second terminals, respectively, for grounding, and similarly another metallic shielding plate is disposed between the third terminal module and the fourth terminal module in the same way. The details are illustrated below.

The electrical receptacle 700 includes an insulative housing 702 forming a front card receiving space 704 and a rear module receiving space 706[. The insulative housing 702 defines a card receiving space 704.] *with* a plurality of upper passageways 708 above the card receiving space 704, and a plurality of lower passageways 710 below the card receiving space 704. A terminal module 712 is disposed in the module receiving space 706 and includes an upper half module 714 and a lower half module 734 stacked with each other in the vertical direction. The upper half module 714 includes an upper front part 716 having a plurality of upper front terminals 718 integrally formed with an upper front insulator 720 via an insert-molding process, and an upper rear part 722 having a plurality of upper rear terminals 724 integrally formed with an upper rear insulator 726 via another insert-molding process, and further with a metallic upper shielding plate 728 sandwiched between the upper front insulator 720 and the upper rear insulator 726 in the vertical direction, wherein the upper shielding plate 728 includes a plurality of upper spring tangs 730 extending upwardly through corresponding holes 721 in the upper front insulator 720 to mechanically and electrically connect to the corresponding selected grounding terminals of the upper front terminals 718, and a plurality of lower spring tangs 732 extending downwardly through corresponding holes 727 of the upper rear insulator 726 to mechanically and electrically connect to the corresponding selected grounding terminals of the upper rear terminals 724. Notably, during mating the front contacting section 717 of the upper front terminals 718 extend into the corresponding upper passageways 708 while the front contacting section 723 of the upper rear terminal 724 extend into the corresponding upper grooves 719 formed in the upper front insulator 720.

Similarly, the lower half module 734 includes a lower front piece 736 having a plurality of lower front terminals 738 integrally formed with a lower front insulator 740 via an insert-molding process, and a lower rear piece 742 having a plurality of lower rear terminals 744 integrally formed with a lower rear insulator 746 via another insert-molding process, and further with a metallic lower shielding plate 748 sandwiched between the lower front insulator 740 and the lower rear insulator 746 in the vertical direction wherein the lower shielding plate 748 includes a plurality of lower spring fingers 750 extending downwardly through the corresponding holes 741 in the lower front insulator 740 to mechanically and electrically connect to the corresponding selected grounding terminals of the lower front terminals 738, and a plurality of upper spring fingers 752 extending upwardly through the corresponding holes 747 of the lower rear insulator 746 to mechanically and electrically connect to the corresponding selected grounding terminals of the lower rear terminals 744. Notably, during mating the front contacting section 737 of the lower front terminals 738 extend into the corresponding lower passageways 710 while the front contacting section 743 of the [upper] *lower* rear terminal 744 extend into the corresponding lower grooves 739 formed in the lower front insulator 740.

Notably, each of the upper shielding plate 728 and the lower shielding plate 748 forms the opening 729, 749 corresponding to the corresponding high speed terminals in the vertical direction for reduction of resonance. Understandably, the layout of the upper front terminals 718 and the upper rear terminals 724, and the lower front terminals 738 and the lower rear terminals 744 are arranged same with those in the first embodiment. The posts-holes structure may be applied to the insulators and shielding plate so as to have the shielding plate retained between the stacked insulator without relative movement both vertically and horizontally. Similar to the first embodiment, in this embodiment the terminals of the same part/piece of the module is equipped with an insulative spacer 760 to secure the tails of the terminals in position without relative movements, and two opposite ends of the spacer 760 is retained in the corresponding slots 703 in an interior surfaces of the housing 702. It is also noted that because the terminals are molded within the corresponding part/piece of the module, the holes 721, 727, 741 and 747 extend through at least one corresponding surface of the insulator of the corresponding part/piece in at least one vertical direction. It is also noted that means for securing the terminal module 712 and the housing 702, e.g., protrusions vs. steps, may be applied thereon optimally. Similar to the first embodiment, even though a rear card received slot *or space* 766 is formed between the upper front insulator 720 and the lower front insulator 740 in the vertical direction *and communicatively aligned with the front card receiving space 704 in the front-to-back direction to commonly form a full card receiving space*, in this embodiments, a pair of slots 705 are optimally formed in opposite interior surfaces of the housing 702 to additionally hold two opposite lateral side edges of the inserted mating tongue, i.e., the printed circuit board of the plug connector, during mating. *Similar to what is disclosed in the first embodiment, the housing 702 forms a downward face 702a and an upward face 702b by two sides of the front card receiving space 704 in the vertical direction. The upper front insulator 720 includes a downward/bottom face 720a directly and intimately downwardly facing the rear card receiving slot 766*

*and being horizontally coplanar with the downward face 702a, and the lower front insulator 740 forms an upward/top face 740a directly and intimately upwardly facing the rear card receiving slot 766 and being horizontally coplanar with the upward face 704b. Furthermore, the upper front insulator 720 forms a forward chamfered structure 7201 directly and intimately downwardly facing the rear card receiving space 766, and the lower front insulator 740 forms a forward chamfered structure 7401 directly and intimately upwardly facing the rear card receiving space 766. In addition, as shown in FIGS. 25(A) and 25(B), when no plug connector is mated, the front contacting section 723 downwardly abuts against the upper front insulator 720, and the front contacting section 743 upwardly abuts against the lower front insulator 740.*

Referring to FIGS. 26(A) to 31, an electrical connector assembly 800 belonging to the QSFP-DD specification, includes a plug connector 830, an electrical receptacle 850, a metallic cage 810 with the corresponding retainer 880, the heat sink 870 and the light pipe 890 thereon, wherein the electrical receptacle 850 is essentially same with the electrical receptacle 200 in the first embodiment. The plug connector 830 includes a metallic base 831, a metallic cover 832 commonly forming a cavity to receive a paddle card 834 therein. A cable 836 includes a plurality of wires 838 soldered upon the paddle card 834. An actuator 840 is moveable along a front-to-back direction for releasing the plug connector from the cage 810 so as to un-mate the plug connector 830 from the electrical receptacle 850.

It is to be understood, however, that even though numerous characteristics and advantages of the present invention have been set fourth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the members in which the appended claims are expressed.

What is claimed is:

1. An electrical receptacle [for being mounted] *for mounting* onto a host board and electrically connecting with a mating electrical circuit board along a front-to-back direction, comprising:

an insulative housing; and a row of first terminals, a row of second terminals, a row of third terminals, and a row of fourth terminals arranged along a vertical direction and mounted in the insulative housing, the first terminals and the fourth terminals forming a first mating port, the second terminals and the third terminals forming a second mating port, the first mating port forwardly extending beyond the second mating port;

wherein the row of first terminals align with the row of second terminals along an up-to-down direction, the row of third terminals align with the row of fourth terminals along the up-to-down direction, the first terminals and the second terminals are offset *from the third and fourth terminals* in a [longitudinal direction] *transverse direction* perpendicular to the vertical direction and the front-to-back direction [from the third terminals and the fourth terminals]*; and wherein*

*each of the first terminals has a first contact section, a first soldering portion, and a first body portion integrally connected between the first contact section and the first soldering portion, each of the second terminals has a second contact section, a second soldering portion, and a second body portion integrally connected between the second contact section and the second soldering portion, each of the third terminals has a third contact section, a third soldering portion, and a third body portion integrally connected between the third contact section and the third soldering portion, and each of the fourth terminals has a fourth contact section, a fourth soldering portion, and a fourth body portion integrally connected between the fourth contact section and the fourth soldering portion; wherein*

*the row of first terminals are insert-molded in a first insulative body to form a first terminal module, the row of second terminals are insert-molded in a second insulative body to form a second terminal module, the row of third terminals are insert-molded in a third insulative body to form a third terminal module, and the row of fourth terminals are insert-molded in a fourth insulative body to form a fourth terminal module; and wherein*

*the first insulative body has a plurality of guide grooves in a bottom surface thereof to respectively receive the second contact sections of the corresponding second contacts, and the fourth insulative body has a plurality of guide grooves in a top surface thereof to respectively receive the third contact sections of the corresponding third contacts.*

2. The electrical receptacle as claimed in claim 1, wherein a center line of the first terminal along the front-to-back direction and a center line of the second terminal along the front-to-back direction are in a same first vertical plane, a center line of the third terminal along the front-to-back direction and a center line of the fourth terminal along the front-to-back direction are in a same second vertical plane.

[3. The electrical receptacle as claimed in claim 2, wherein a distance of adjacent first vertical plane and second vertical plane is 0.4 mm.]

4. The electrical receptacle as claimed in claim 1, wherein [the first terminal has a first soldering portion; the second terminal has a second soldering portion; the third terminal has a third soldering portion; the fourth terminal has a fourth soldering portion;] the fourth soldering portion, the third soldering portion, the second soldering portion and the first soldering portion are *respectively* arranged in [front to back] *the front-to-back direction.*

5. The electrical receptacle as claimed in claim 4, wherein the second soldering portion aligns [to a space of] *with a space between* two adjacent third soldering portions.

6. The electrical receptacle as claimed in claim 1, wherein the first [terminal] *terminals are further* insert-molded in [a first insulative body and] a first position part [forms a first terminal module]; the second [terminal] *terminals are further* insert-molded in [a second insulative body and] a second position part [forms a second terminal module]; the third [terminal] *terminals are further* insert-molded in [a third insulative body and] a third position part [forms a third terminal module; the fourth terminal insert-molded in a fourth insulative body forms a fourth terminal module].

7. The electrical receptacle as claimed in claim 6, wherein the first [terminal] *body portion* has [a first contact section,] a first horizontal section and a first vertical section, the first insulative body over-molding on the first horizontal section, the first position part over-molding on the first vertical section; the second [terminal] *body portion* has [a second contact section,] a second horizontal section and a second vertical section, the second insulative body over-molding on the second horizontal section, the second position part over-molding on the second vertical section; the third [terminal] *body portion* has [a third contact section,] a third horizontal section and a third vertical section, the third insulative body over-molding on the third horizontal section, the third position part over-molding on the third vertical section; the fourth [terminal] *body portion* has [a fourth contact section,] a fourth horizontal section and a fourth vertical section, the fourth insulative body over-molding on the fourth horizontal section; the insulative housing has a row of fixed slots, [the fourth vertical section received in the fixed slot] *and each fourth vertical section is received in a respective one of the fixed slots*.

8. The electrical receptacle as claimed in claim 7, wherein the insulative housing has a top face and a bottom face, the top face [defined] *defines* a first guide groove for receiving the first contact section, *and* the bottom face [defined] *defines* a fourth guide groove for receiving the fourth contact section.

[9. The electrical receptacle as claimed in claim 6, wherein the first insulative body is defined a guide groove on a bottom surface thereof for receiving a contact section of the second terminal, and the fourth insulative body is defined a guide groove on a top surface thereof for receiving a contact section of the third terminal.]

10. The electrical receptacle as claimed in claim 7, wherein the first insulative body [is defined] *defines* a first slit for exposing the first horizontal section, the first position part [is defined] *defines* a first opening for exposing the first vertical section; *and* the second insulative body [is defined] *defines* a second slit for exposing the second horizontal section, the second position part [is defined] *defines* a second opening for exposing the second vertical section; *and* the third insulative body [is defined] *defines* a third slit for exposing the third horizontal section, the third position part [is defined] *defines* a third opening for exposing the third vertical section; *and* the fourth insulative body [is defined] *defines* a fourth slit for exposing the fourth horizontal section.

11. An electrical receptacle for mating with a plug connector, comprising:

an insulative housing defining a front card receiving space and a rear module receiving space;

a terminal module received within the module receiving space and comprising:

an upper half module and a lower half module stacked with each other in a vertical direction;

said upper half module including an upper front part and an upper rear part cooperating with each other *so as* to sandwich an upper shielding plate therebetween in the vertical direction, the upper front part including a plurality of upper front terminals integrally formed with an upper front insulator via insert-molding, the upper rear part including a plurality of upper rear terminals integrally formed with an upper rear insulator via insert-molding, said upper shielding plate forming a plurality of upper springs extending upwardly through corresponding holes in the upper front insulator to mechanically and electrically connect corresponding upper front terminals for grounding, and a plurality of lower springs extending downwardly through corresponding holes to mechanically and electrically connect corresponding upper rear terminals for grounding; wherein front contacting sections of the upper front terminals and those of the upper rear terminals are located on a same upper side [of] *with respect to* the *front* card receiving space; and the lower half module includes a plurality of lower front terminals and a plurality of lower rear terminals, and front contacting sections of the lower front terminals and those of the lower rear terminals are located on a same lower side [of] *with respect to* the *front* card receiving space.

12. The electrical receptacle as claimed in claim 11, wherein during mating with a plug connector, the front contacting sections of the upper front terminals are received within corresponding upper passageways formed by an upper wall of the housing while the front contacting sections of the upper rear terminals are received within corresponding upper grooves formed in the upper front insulator.

[13. The electrical receptacle as claimed in claim 11, wherein the front contacting sections of the upper front terminals are located in front of and aligned with those of the upper rear terminals in a front-to-back direction perpendicular to said vertical direction.]

14. The electrical receptacle as claimed in claim 11, wherein the upper half module and the lower half module [commonly forms] *form* a rear card receiving space aligned with the front card receiving space in the front-to-back direction.

[15. The electrical receptacle as claimed in claim 14, wherein said rear card receiving space is confined by the upper front insulator.]

16. The electrical receptacle connector as claimed in claim 14, wherein two opposite lateral interior surfaces of the housing define a pair of grooves for holding two opposite lateral side edges *of* a mating tongue of the plug connector.

17. An electrical receptacle [mounted onto] *for mounting* a host board and electrically connecting with a mating electrical circuit board, comprising:

an insulative housing; and a row of first terminals, a row of second terminals, a row of third terminals, and a row of fourth terminals arranged along a vertical direction and mounted in the insulative housing, the first terminals and the fourth terminals forming a first mating port, the second terminals and the third terminals forming a second mating port, the first mating port forwardly extending beyond the second mating port;

wherein the row of first terminals align with the row of second terminals along an up-to-down direction, the row of third terminals align with the row of fourth terminals along the up-to-down direction, the first terminals and the second terminals are offset in a [longitudinal] *transverse* direction from the third terminals and the fourth terminals; *wherein* the first [terminal is] *terminals are* insert-molded with a first insulative body and a first position part to form a first terminal module, the second [terminal is] *terminals are* insert-molded with a second insulative body and a second position part to form a second terminal module, the third [terminal is] *terminals are* insert-molded with a third insulative body and a third position part to form a third terminal module, and the fourth [terminal is] *terminals are* insert-molded with a fourth insulative body to form a fourth terminal module; *wherein*

[the] *each* first terminal has *unitarily* a first contact section, a first horizontal section, and a first vertical section, the first insulative body over-molding on the first horizontal section, the first position part over-molding on the first vertical section, [the] *each* second terminal has *unitarily* a second contact section, a second horizontal section, and a second vertical section, the second insulative body over-molding on the second horizontal section, the second position part over-molding on the second vertical section, [the] *each* third terminal has *unitarily* a third contact section, a third horizontal section, and a third vertical section, the third insulative body over-molding on the third horizontal section, the third position part over-molding on the third vertical section, [the] *each* fourth terminal has *unitarily* a fourth contact section, a fourth horizontal section, and a fourth vertical section, the fourth insulative body over-molding on the fourth horizontal section, and the insulative housing has a row of fixed slots, [the fourth vertical section received in the fixed slot] *and each fourth vertical section is received in a respective one of the fixed slots*; and the first insulative body has a guide groove on a bottom surface thereof for receiving *one of* the second contact [section] *sections*, and the fourth insulative body has a guide groove on a top surface thereof for receiving *one of* the third contact section.

*18. An electrical receptacle for mating with a plug connector having a paddle card, comprising:*

*an insulative housing defining a front card receiving space and a rear module receiving space in a front-to-back direction;*

*a terminal module received within the module receiving space and comprising:*

*an upper half module and a lower half module stacked with each other in a vertical direction perpendicular to the front-to-back direction;*

*said upper half module including an upper front part and an upper rear part stacked with each other in the vertical direction, the upper front part including a plurality of upper front terminals integrally formed with an upper front insulator via insert-molding, the upper rear part including a plurality of upper rear terminals integrally formed with an upper rear insulator via insert-molding;*

*the lower half module including a lower front part and a lower rear part stacked with each other in the vertical direction, the lower front part including a plurality of lower front terminals integrally formed with a lower front insulator via insert-molding, the lower rear part including a plurality of lower rear terminals integrally formed with a lower rear insulator via insert-molding;*

*a rear card receiving space formed between the upper front insulator and the lower front insulator in the vertical direction so as to cooperate with the front card receiving space to form a full card receiving space for receiving the paddle card of the plug connector;*

*front contacting sections of the upper front terminals and those of the upper rear terminals being located on a same upper side of the full card receiving space;*

*front contacting sections of the lower front terminals and those of the lower rear terminals being located on a same lower side of the full card receiving space;*

*a bottom face of the upper front insulator downwardly facing toward the rear card receiving space, and a top face of the lower front insulator upwardly facing toward the rear card receiving space; wherein*

*the housing includes a downward face and an upward face, the downward face downwardly faces the front card receiving space, the downward face is horizontally coplanar with the bottom face of the upper front insulator, the upward face upwardly faces the front card receiving space, and the upward face is horizontally coplanar with the top face of the lower front insulator.*

*19. The electrical receptacle as claimed in claim 18, wherein the upper front terminals and the upper rear terminals are aligned with each other in the front-to-back direction, respectively, and the lower front terminals and the lower rear terminals are aligned with each other in the front-to-back direction, respectively, while being offset from the corresponding upper front terminals and upper rear terminals in a transverse direction perpendicular to both the front-to-back direction and the vertical direction.*

*20. The electrical receptacle as claimed in claim 19, wherein each of the upper front terminals, the upper rear terminals, the lower front terminals and the lower rear terminals includes a unitary front contacting section, rear mounting section and right angle shaped body section therebetween.*

*21. The electrical receptacle as claimed in claim 18, wherein a front end face of the upper front insulator forms a chamfered structure downwardly facing the full card receiving space, and a front face of the lower front insulator forms an upward chamfered structure upwardly facing the full card receiving space.*

*22. The electrical receptacle as claimed in claim 18, wherein the front contacting section of each upper rear terminal abuts against the upper front insulator, and the front contacting section of each lower rear terminal abuts against the lower front insulator.*

*23. The electrical receptacle as claimed in claim 18, wherein the upper front insulator forms a plurality of guide grooves to receive the front contacting sections of the corresponding upper rear terminals, respectively, and the lower front insulator forms a plurality of guide grooves to receive the front contacting sections of the corresponding lower rear terminals, respectively.*

*24. The electrical receptacle as claimed in claim 18, wherein the housing forms a pair of slots in two opposite lateral interior surfaces of two sides of the terminal module for holding the paddle card of the plug connector during mating.*

* * * * *